(12) United States Patent
Bodwell et al.

(10) Patent No.: US 11,898,585 B2
(45) Date of Patent: Feb. 13, 2024

(54) DECKING HANGER SYSTEM AND DECKING HANGER

(71) Applicant: Verco Decking, Inc., Phoenix, AZ (US)

(72) Inventors: Patrick Allen Bodwell, Auburn, CA (US); Jeffrey Reino Martin, Fremont, CA (US)

(73) Assignee: VERCO DECKING, INC., Phoenix, AZ (US)

( * ) Notice: Subject to any disclaimer, the term of this patent is extended or adjusted under 35 U.S.C. 154(b) by 0 days.

(21) Appl. No.: 17/498,086

(22) Filed: Oct. 11, 2021

(65) Prior Publication Data
US 2022/0026018 A1 Jan. 27, 2022

Related U.S. Application Data

(63) Continuation of application No. 16/228,001, filed on Dec. 20, 2018, now Pat. No. 11,168,719.
(Continued)

(51) Int. Cl.
*F16B 2/04* (2006.01)
*E04B 1/00* (2006.01)
(Continued)

(52) U.S. Cl.
CPC ............... *F16B 2/04* (2013.01); *E04B 1/003* (2013.01); *F16M 13/027* (2013.01); *F16L 3/18* (2013.01)

(58) Field of Classification Search
CPC . F16B 2/065; F16B 2/04; F24S 25/632; F24S 25/636; E04B 1/003; E04B 9/00;
(Continued)

(56) References Cited

U.S. PATENT DOCUMENTS 3,372,523 A 3/1968 Hall, Jr.
3,769,774 A * 11/1973 Barnes .................. F16L 3/14
52/39
(Continued)

OTHER PUBLICATIONS

International Search Report and Written Opinion for International Application No. PCT/US2018/066845 dated Feb. 28, 2019.
(Continued)

*Primary Examiner* — Monica E Millner
(74) *Attorney, Agent, or Firm* — Moore & Van Allen PLLC; Jeffrey R. Gray

(57) ABSTRACT

Decking hangers (e.g., strut hangers, flexible hangers, combinations thereof, or the like) are utilized along with keys (e.g., continuous keys, discontinuous keys, combination thereof, or the like) to hang decking components from structural decking (e.g., fluted steel structural decking, or the like). The decking hangers may be rigid and/or flexible, and include an adjustment that allows one end of the hanger to move with respect to another end. The keys may be continuous and run longitudinally parallel with the direction of the webs of the flutes of the decking. Alternatively, the keys may be discontinuous having a continuous side (e.g., continuous perimeter), or multiple sides, that enclose a corresponding connector at an end of a hanger. The keys provide different locations for installing the hangers and/or providing multiple (e.g., two or more) points of connection on at least one end of a single hanger.

21 Claims, 28 Drawing Sheets

Related U.S. Application Data

(60) Provisional application No. 62/609,983, filed on Dec. 22, 2017.

(51) Int. Cl.
*F16M 13/02* (2006.01)
*F16L 3/18* (2006.01)

(58) Field of Classification Search
CPC .... E04B 5/48; E04B 5/32; E04B 5/40; F16M 13/00; F16M 13/02; F16M 13/027; F16M 11/00; F16M 11/041; F16M 11/10; F16L 3/00; F16L 3/18
See application file for complete search history.

(56) References Cited

U.S. PATENT DOCUMENTS

| | | | |
|---|---|---|---|
| 4,085,558 A | 4/1978 | Albrecht | |
| 4,697,399 A * | 10/1987 | Ryan | E04B 5/40 52/630 |
| 4,962,622 A | 10/1990 | Albrecht et al. | |
| 5,551,204 A | 9/1996 | Mayrand | |
| 5,743,063 A | 4/1998 | Boozer | |
| 7,603,814 B1 * | 10/2009 | Hartmann | G09F 7/18 52/27 |
| 8,683,774 B2 | 4/2014 | Strickland et al. | |
| 9,850,659 B2 * | 12/2017 | Roth | F16B 2/065 |
| 10,180,154 B2 | 1/2019 | Muntasser | |
| 10,718,112 B1 * | 7/2020 | Roth | F16B 2/065 |
| 2009/0272067 A1 | 11/2009 | Gilham | |
| 2011/0174951 A1 * | 7/2011 | Sander, Jr. | E04B 9/18 248/339 |
| 2012/0291386 A1 | 11/2012 | Miniscloux | |
| 2016/0290557 A1 | 10/2016 | Roth | |

OTHER PUBLICATIONS

International Preliminary Report on Patentability International Application No. PCT/US2018/066845 dated Jun. 23, 2020.

* cited by examiner

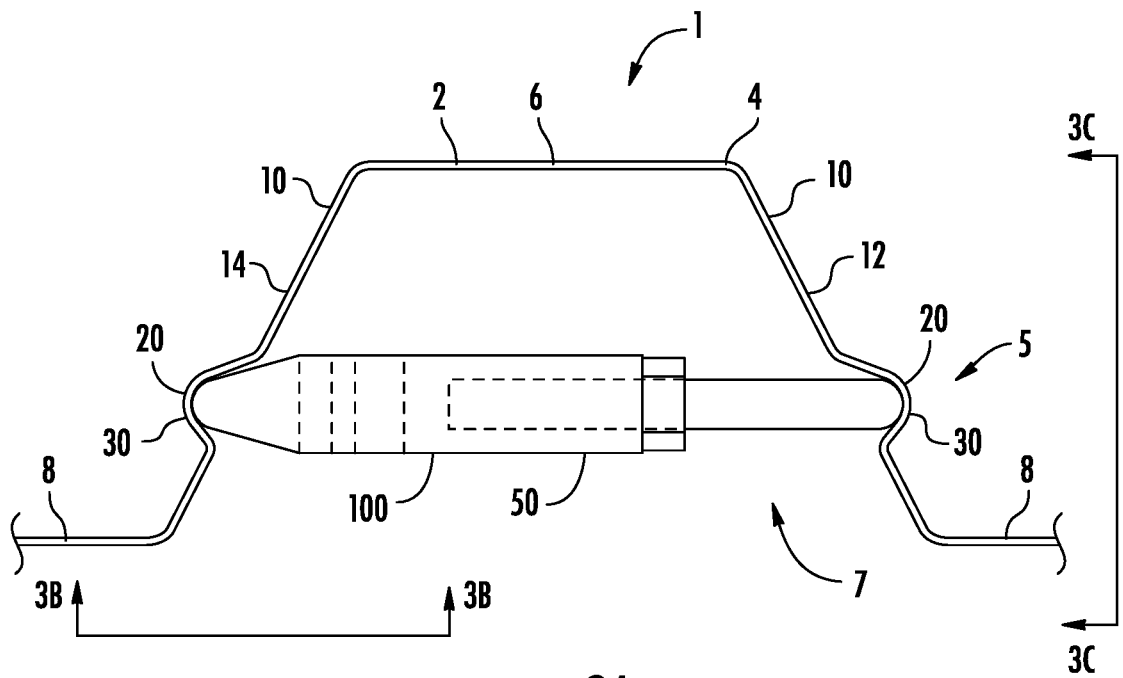
FIG. 3A
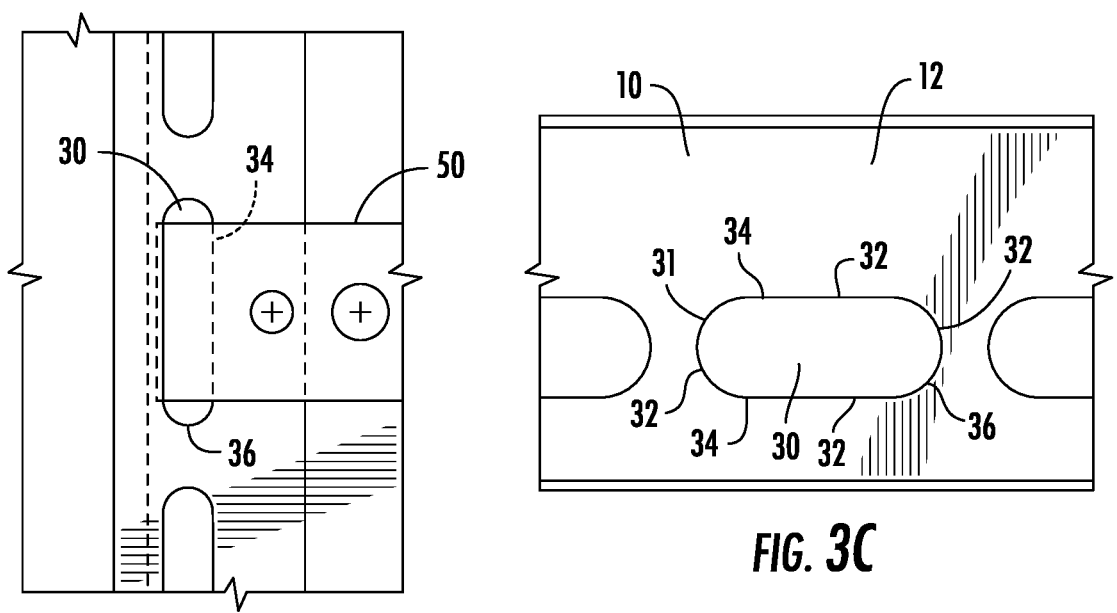
FIG. 3B
FIG. 3C

A-A "OUT"

B-B "IN"

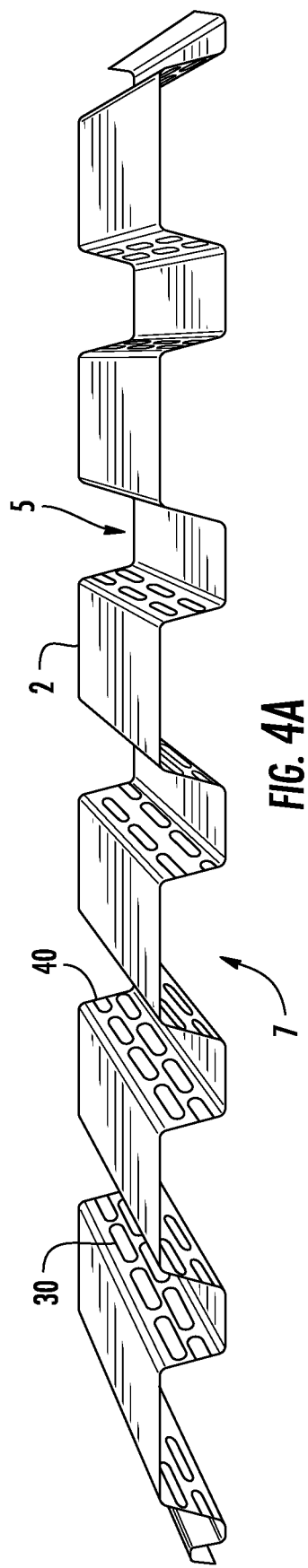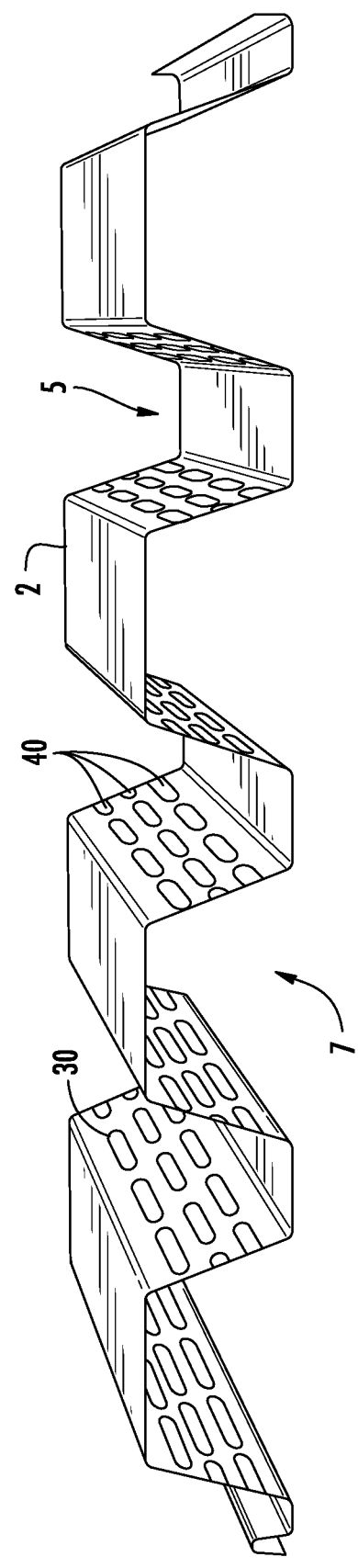
FIG. 4A
FIG. 4B

DECKING HANGER SYSTEM AND DECKING HANGER

CROSS REFERENCE AND PRIORITY CLAIM UNDER 35 U.S.C. § 119

The present application is a continuation of, and claims priority to U.S. patent application Ser. No. 16/228,001 entitled "Decking Hanger System and Decking Hanger" filed on Dec. 20, 2018 which claims priority to U.S. Provisional Patent Application Ser. No. 62/609,983 entitled "Decking Hanger System and Decking Hanger" filed on Dec. 22, 2017, both of which are assigned to the assignee hereof and hereby expressly incorporated by reference herein.

FIELD

This application relates generally to the field of structural decking systems, and more particularly to improvements to decking hangers and decking hanger systems.

BACKGROUND

Hanging components, such as lights, HVAC, pipes, and/or other building components, from structural decking (e.g., ceiling or roof structural decking) can be a time intensive and multi-stepped process. For example, the process may require a lift or ladder to reach the structural decking, using a drill to drill into the structural decking and, in some cases, into concreate above such decking, and utilizing tools to install the hanger system into the drilled portions of the decking and/or the concreate. Moreover, if the hanging system requires repositioning in the future, the multistep process must be repeated, and in some cases the concreate and/or decking is repaired. As such, there is a need to provide improved decking hanger systems with improved decking hangers.

BRIEF SUMMARY

The present invention relates to utilizing decking hangers (e.g., strut hangers, flexible hangers, combinations thereof, or the like) along with keys (e.g., continuous keys, discontinuous keys, combinations thereof, or the like) to hang components from structural decking (e.g., fluted steel structural decking, or the like). In some embodiments the strut hangers may be rigid and are assembled through an adjustment mechanism that allows one end of the hanger to move with respect to another end. In other embodiments of the invention the flexible hangers may be flexed and placed into position. In other embodiments portions of the decking hangers may be rigid and portions may be flexible. Each end of the decking hangers may be extended (e.g., using an adjustment mechanism, flexed into position, or the like) into the keys during assembly.

The keys may be continuous and run longitudinally parallel with the direction of the webs of the flutes of the decking. Alternatively, the keys may be discontinuous having a continuous side (e.g., continuous perimeter), or multiple sides, that enclose a corresponding end of a decking hanger. The discontinuous keys may have lengths that run longitudinally along with the webs of the flutes and heights that run perpendicular with the longitudinally running webs of the flutes. In some embodiments, the lengths of the discontinuous keys are longer than the heights. Moreover, the discontinuous keys may be located in a row in series longitudinally along with the longitudinal lengths of the webs and flutes of the decking. In some embodiments, there may be multiple rows of discontinuous keys within a web. Alternatively, the discontinuous keys may run perpendicular to the longitudinal lengths of the webs and flutes. As such, in some embodiments, the heights of the discontinuous keys may be longer than the lengths. The discontinuous keys may be of any shape, as will be described in further detail herein. Moreover, in some embodiments, continuous keys, discontinuous keys with lengths longer than heights and/or discontinuous keys with heights longer than lengths may be utilized within the webs of the decking to provide different locations for installing the hangers and/or providing multiple (e.g., two or more) points of connection on at least one end of a single hanger for connection with the one or more keys (e.g., two or more separate keys) provided in the webs. It should be further understood that the discontinuous keys may be orientated at an angle between running parallel or perpendicular with the longitudinally running webs of the flutes of the decking.

Embodiment of the invention comprise decking hanger systems. The decking hanger systems may comprise at least one decking panel comprising a plurality of decking flutes, wherein each of the plurality of decking flutes comprise an upper flange, a lower flange, and one or more webs operatively coupling the upper flange and the lower flange. One or more keys are formed in the one or more webs of one or more flutes of the plurality of decking flutes within the at least one decking panel. The one or more keys are pre-formed into the one or more webs. The decking hanger system further comprises a hanger. The hanger comprises a first end, a second end, and an adjustment for moving the first end with respect to the second end. The first end or the second end comprise one or more connectors, and the one or more connectors of the first end or the second end is operatively coupled to the one or more keys formed in the one or more webs.

In further accord with embodiments of the invention, the one or more keys comprise a plurality of discontinuous keys formed in the one or more webs.

In other embodiments of the invention, at least a portion of the plurality of discontinuous keys have key lengths that are greater than key heights, and extend longitudinally with the one or more flutes.

In yet other embodiments of the invention, at least the portion of the plurality of discontinuous keys are located in series in a row.

In still other embodiments of the invention, at least the portion of the plurality of discontinuous keys are located in two or more rows.

In further accord with embodiments of the invention, at least a portion of the plurality of discontinuous keys have key heights that are greater than key lengths, and extend longitudinally with the one or more flutes.

In other embodiments of the invention, at least the portion of the plurality of the discontinuous keys are located in series in a row.

In yet other embodiments of the invention, the portion of the plurality of discontinuous keys are located in two or more rows.

In still other embodiments of the invention, the one or more keys resist lateral movement and longitudinal movement in all directions of the first end of the hanger.

In further accord with embodiments of the invention, the first end of the hanger comprises two or more connectors, wherein each of the two or more connectors are configured for operatively coupling with separate keys of two or more keys.

In other embodiments of the invention, the one or more keys are formed in at least a first web and at least a second web opposite the first web of the one or more flutes.

In yet other embodiments of the invention, the one or more connectors of the first end are operatively coupled to one or more first keys of the first web, and the one or more connectors of the second end are operatively coupled to one or more second keys of the second web.

In still other embodiments of the invention, the one or more connectors of the first end or the second end comprise a connector shape that corresponds to a key shape of the one or more keys.

In further accord with other embodiments of the invention, the one or more connectors of the first end or the second end comprise a connector shape that is a point connector, a rounded line connector, a hemisphere connector, a flat connector, a radiused connector, or an edge connector.

In other embodiments of the invention, the adjustment for moving the first end with respect to the second end comprises a fastener that rotates to move the first end with respect to the second end, a slide that allows the first end to move with respect to the second end, a flexing in the hanger to move the first end with respect to the second end, or a lever.

In yet other embodiments of the invention, the hanger further comprises one or more orientation projections operatively coupled to the hanger adjacent the first end or the second end.

In still other embodiments of the invention, the one or more orientation projections allow operative coupling of the one or more connectors of the first end or the second end to the one or more keys in one or more orientations, while preventing operative coupling of the one or more connectors of the first end or the second end to the one or more keys in one or more other orientations.

Embodiments of the invention may comprise a hanger for a decking system. The decking system comprises a first end, a second end, and an adjustment for moving the first end with respect to the second end. The first end or the second end may comprise one or more connectors, and the one or more connectors of the first end or the second end is configured to be operatively coupled to one or more keys formed in one or more webs of one or more decking panels.

In further accord with embodiments of the invention, the first end comprises two or more connectors, and each of the two or more connectors are configured for operatively coupling with separate keys of two or more keys.

In other embodiments of the invention, the one or more connectors of the first end or the second end comprise a connector shape that is a point connector, a rounded line connector, a hemisphere connector, a flat connector, a radiused connector, or an edge connector.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detail description of the invention taken in conjunction with the accompanying drawings, which illustrate embodiments of the invention and which are not necessarily drawn to scale, wherein:

FIG. 3A illustrates a side view of the decking hanger system with a hanger end mating with a discontinuous key in the decking, in accordance with some embodiments of the invention.

FIG. 3B illustrates a bottom view of FIG. 3A of the decking hanger system with a hanger end mating with a discontinuous key in the decking, in accordance with some embodiments of the invention.

FIG. 3C illustrates a side view of FIG. 3A of the decking hanger system with discontinuous keys in the decking, in accordance with some embodiments of the invention.

FIG. 4A illustrates decking having discontinuous keys in two rows within the webs of the decking and extending longitudinally along the lengths of the webs, in accordance with some embodiments of the invention.

FIG. 4B illustrates decking having discontinuous keys in three rows within the webs of the decking and extending longitudinally along the lengths of the webs, in accordance with some embodiments of the invention.

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, the decking hanger 50 of the decking system 1 of the present invention may be a strut hanger 100, a flexible hanger 200, combinations thereof, or the like. The strut hanger 100 of the present invention may be a rigid device, while the flexible hanger 200 may flex, both of which span between the webs of decking and both of which support loads from components hanging below the decking.

Figure 1:
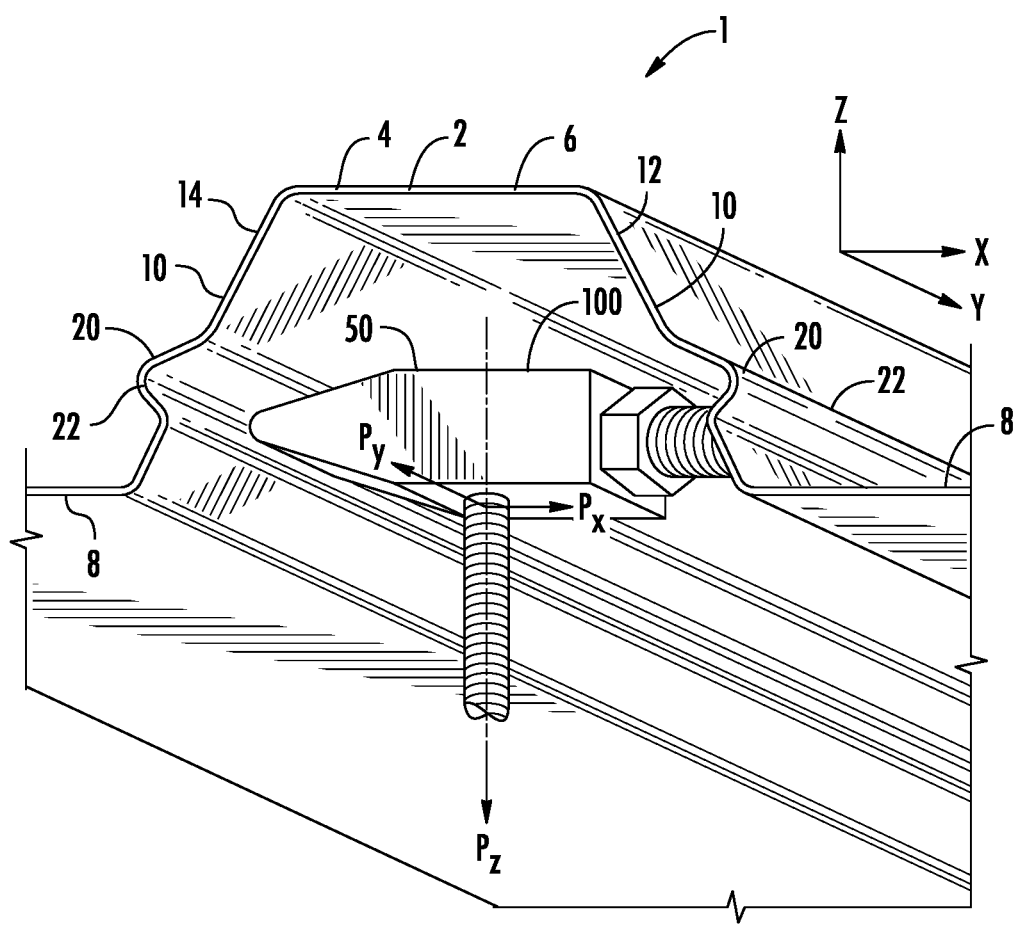
FIG. 1 illustrates a perspective view of the decking hanger system and the associated loading of a decking hanger in such a hanger system, in accordance with some embodiments of the invention.
Figure 2A:
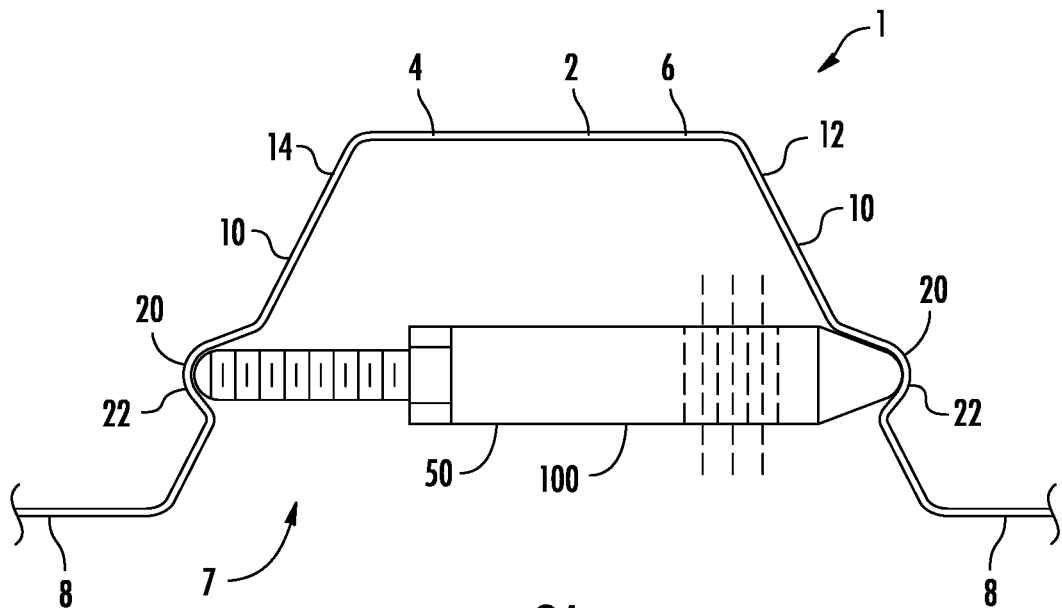
FIG. 2A illustrates a side view of the decking hanger system with a surface mating fit between the hanger end and the continuous decking key, in accordance with some embodiments of the invention.
Figure 2B:
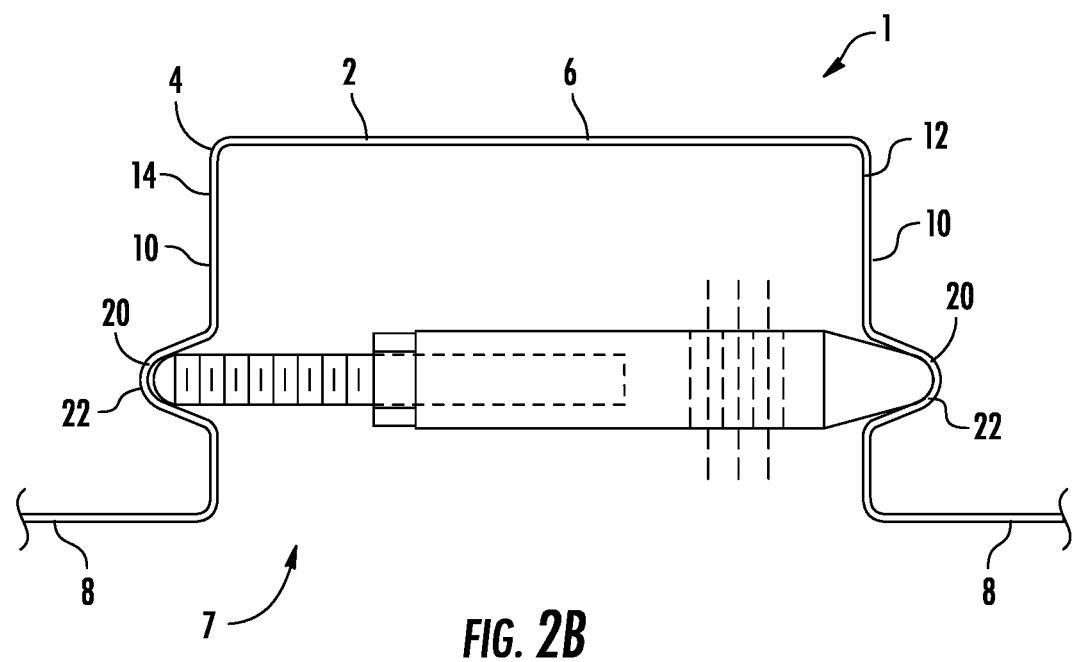
FIG. 2B illustrates a side view of the decking hanger system with a surface mating fit between the hanger end and the continuous decking key, in accordance with some embodiments of the invention.
Figure 3D:
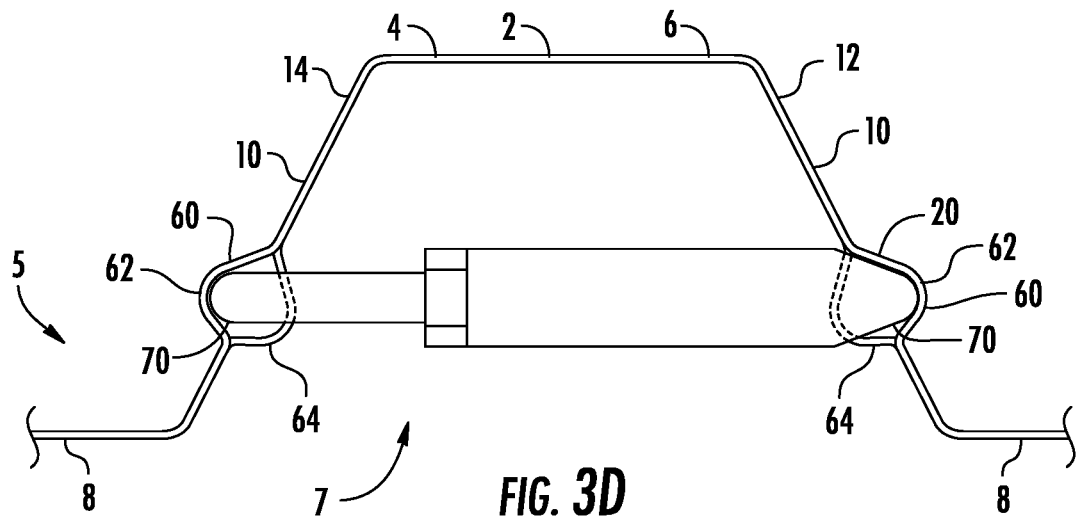
FIG. 3D illustrates a side view of the decking hanger system with a hanger end mating with a vented key in the decking, in accordance with some embodiments of the invention.
Figure 3E:
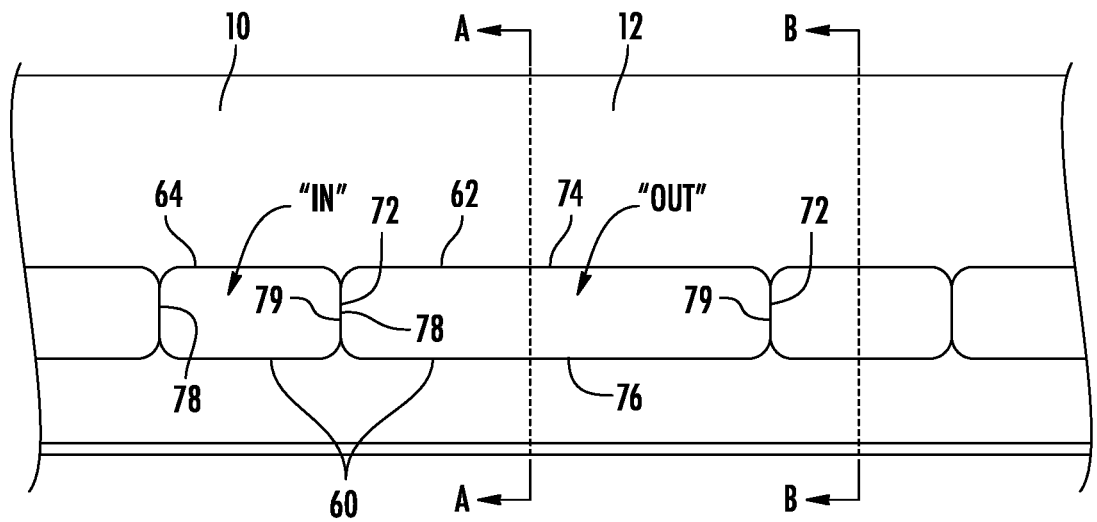
FIG. 3E illustrates a side view of FIG. 3D of the decking hanger system with discontinuous vented keys in the decking, in accordance with some embodiments of the invention.
Figure 3F:
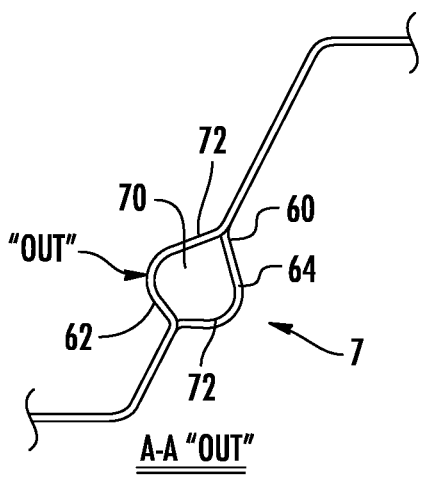
FIG. 3F illustrates a cross-sectional view of FIG. 3E of the decking hanger system with a discontinuous outward vented key in the decking, in accordance with some embodiments of the invention.
Figure 3G:
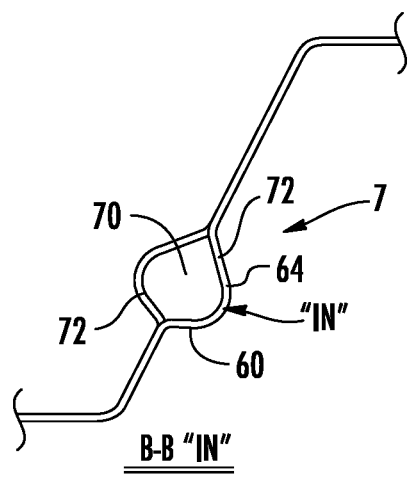
FIG. 3G illustrates a cross-sectional view of FIG. 3E of the decking hanger system with a discontinuous inward vented key in the decking, in accordance with some embodiments of the invention.

As illustrated in FIGS. 1, 2A, and 2B the decking system 1 may comprise decking 2 (e.g., steel structural decking, or the like) and at least one decking hanger 50. The decking 2 may comprises a plurality of flutes 4, each flute having an upper flange 6 (otherwise described as a top flange), a lower flange 8 (otherwise described as a bottom flange), and at least two webs 10. Each web 10 operatively couples an upper flange 6 to a separate lower flanges 8. Moreover, the webs 10 of a flute 4 may be described as a first web 12 and a second web 14. Each web 10 may have one or more keys 20 (e.g., continuous keys 22, discontinuous keys 30, or the like as will be discussed herein). The hanger 50 of the decking system 1 is used to hang components from the decking, which will be described in further detail herein.

As illustrated in FIG. 1, the decking hanger system 1, and the decking hanger 50 used in such a system 1, are exposed to vertical loads and lateral loads from the components hanging from the decking hanger 50, from the decking 2 itself, as well as from the building structure itself. It should be understood that a load, P, applied to the hanger at any orientation below the deck and can be broken down into the x, y, and z vector components, as illustrated in FIG. 1. The x component represents shear in the plane of the steel deck perpendicular to the flutes 4 (e.g., lateral loading perpendicular with the longitudinally extending flutes 4 in the decking 2), y represents shear in the plane of the steel deck parallel to the flutes 4 (e.g., lateral loading parallel with the longitudinally extending flutes 4), and z represents tension or compression applied normal to the plane of the decking.

It should be understood that the decking hanger 50 may be a beam that spans between the webs 10 of the decking 2 engaging the continuous keys 22 (continuous ribs, grooves, or the like) in the decking 2 as shown in FIG. 1, or discontinuous keys (discontinuous embossments, deformations, or the like) in the decking 2 as shown in FIGS. 3A-3B and FIGS. 4A-4P. As will be described in further detail herein, the present invention utilizes improved ends of the hanger 50 (e.g., improved surface to increase surface to surface contact with the keys, multiple connectors on at least one end, or the like) and/or a plurality of discontinuous keys 30 and/or continuous keys in the decking 2 to improve the operative coupling of the decking hanger 50 to the decking 2. As such, the present invention provides a decking hanging system 1 that can resist larger loads, is less prone to and end of a hanger 50 slipping within a key 20, and provides improved installation.

It should be understood that the keys 20 (e.g., the continuous keys 22 and/or discontinuous keys 30) described herein may serve other purposes besides being the means of engagement for the decking hangers 50. For example, the keys 20 (e.g., continuous or discontinuous) may allow for composite behavior between concrete flooring and the structural decking 2. That is, the keys (e.g., along with the flutes of the structural steel decking 2) provide engagement with the concrete, which allows the two dissimilar materials (i.e., the steel decking and the concrete) to act together to provide structural support for resistance to loading.

As illustrated in FIG. 1, the decking hangers 50 bear on the surface of the keys 20 to resist loading normal ($P_z$) to the decking 2, and bear against the keys 20 to resist shear loading in the plane of the decking 2 ($P_x$) perpendicular to the flutes 4 of the decking 2. For decking 2 with continuous keys 22 the hangers 50 use friction to resist shear load in the plane of the decking 2 ($P_y$) parallel to the flutes 4 of the decking 2. The friction to resist the load is developed through extension (e.g., mechanical, spring, or the like) of the hanger 50 pressing into the keys 20 of the decking 2. For decking 2 with discontinuous keys 30 the decking hanger 50 may use friction against the discontinuous keys 30, bearing against a side of the discontinuous keys 30 (e.g., any one of the one or more sides of the key), or a combination thereof to resist shear load in the plane of the decking 2 parallel to the flutes 4 as shown in FIGS. 3A-3C. As such, in some embodiments of the invention the discontinuous keys 30 may provide an improved decking system 1 over the use of only continuous keys 22 due in part to the additional sides of the discontinuous key 30 that provide improved resistance to loading of the decking hangers 50.

As will be described herein in further detail with respect to FIGS. 2A-17B, the decking hangers 50 extend outward, and thereby are operatively coupled to the keys 20 of the decking 2 in at least one location on each web 10. Moreover, as will be described herein, some embodiments may include at least one connector on each end of a hanger 50, which is suitable for resisting loading in all load orientations with both friction and with one or more sides of the discontinuous keys (e.g., one continuous side, multiple sides, or the like). In some embodiments of the inventions, the figures also illustrate a decking hanger 50 with three or more points of contact (e.g., at least one connector operatively coupled to one key in a first web, at least two connectors operatively coupled to one or more keys in a second web opposing the first web, or the like). The embodiments of the decking hanger system 1 with three or more points of content may offer superior performance over a decking hanger system 1 with only two points of contact (e.g., one in each opposing web). The decking hanger system 1 with three or more points of contact may distribute the load to more points of contact with the webs 10, thus increasing the loading capabilities. Moreover, the decking hangers 50 with three points of contact may also offer significantly superior shear resistance to loads in the plane of the decking 2 parallel to the flutes 4 ($P_y$). Three points of contact may also eliminate the problem of the decking hangers 50 releasing from the decking 2 in the event one end of the hanger 50 slips in the $P_y$ direction allowing the hanger 50 to rotate in the plane of the decking 2, thus disengaging. If the hanger 50 slips in the $P_y$ direction with three points of contact the hanger 50 would be restrained from rotating in the plane of the decking thus staying engaged in the decking 2 even after the device has slipped. Moreover, the three points of contact may also prevent rotation of the hanger 50 around the longitudinal axis of the hanger 50 (e.g., around the $P_x$ direction), as opposed to a hanger 50 having only two points of contact (e.g., one with each opposing web) which may allow rotation around the $P_x$ direction.

FIGS. 2A and 2B illustrate some embodiments of the invention in which the decking hangers 50 may be extended within decking 2, such as within a decking flute 4 having an upper flange 6 operatively coupled to two lower flanges 8 through the use of webs 10, such as the first web 12 and the second web 14. As illustrated in FIGS. 2A and 2B the webs may be in any orientation with respect to the flanges, such as angled and/or perpendicular with respect to the upper flange 4 and/or lower flange 6. Each of the webs 10 may comprise one or more keys 20. In some embodiments of the invention the keys 20 may be continuous keys 22 that run the length of, or the majority of the length of, the webs 10 of the flute 4, as illustrated in FIGS. 2A and 2B.

Alternatively, as illustrated in FIGS. 3A-3C, the keys 20 may be discontinuous keys 30. Each discontinuous key 30 may include one or more sides 32 (e.g., single continuous side, or multiple sides, or the like). It should be understood that each discontinuous key 30 may be any shape, such as circular, oval, triangular, square, rectangular, any polygonal shape, any general shape of the forgoing (e.g., generally square, or the like), or any irregular shape. In one example, as illustrated in FIGS. 3B and 3C, each discontinuous key 30 may include sides 32 having opposing lengths 34 (e.g., upper or first side, and lower or second side) and opposing heights 36 (e.g., left or third side, and right or fourth side). In some embodiments of the invention the lengths 34 may be longer than the heights 36, the heights 36 may be longer than the lengths 34, or the lengths 34 and heights may be equal. It should be understood that any number of continuous keys 22 and/or any number of discontinuous keys 30 may be utilized by within the webs 10 of the decking 2.

Figure 4C:
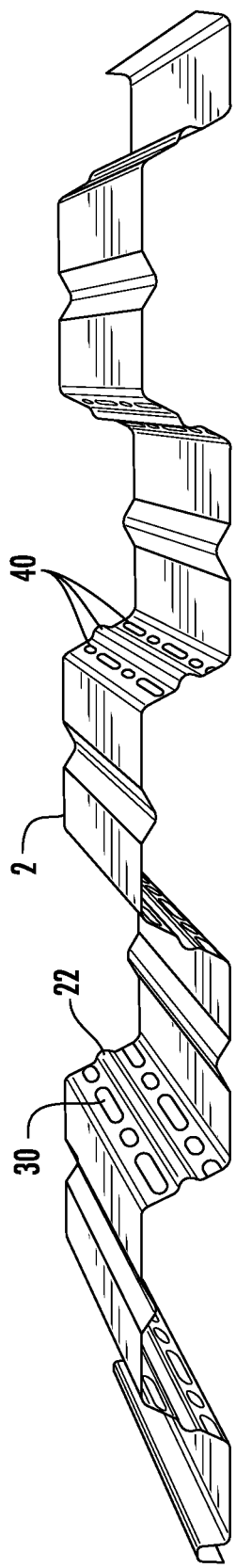
FIG. 4C illustrates decking having both discontinuous keys of different lengths and continuous keys in three rows within the webs of the decking and extending longitudinally along the lengths of the webs, in accordance with some embodiments of the invention.

As illustrated by FIGS. 3D to 3G, in some embodiments of the invention the discontinuous keys 30 may comprise discontinuous vented keys 60. The vented keys 60 may be formed during the rolling of the steel decking (or using other post rolling processes) such that a portion of the key 20 is separated (e.g., detached) from the web 10 and/or an adjacent key 20 in the web 10. For example, a portion of a key 20 may be sheared, punched, torn, cut, or the like in order for the key 60 to also act as a vent. The discontinuous vented keys 60 may comprise outwardly extending discontinuous vented keys 62 and inwardly extending discontinuous vented keys 64. The outwardly extending discontinuous vented keys 62 extend outwardly from the webs 10 into the upper flute cavity 5. Alternatively, the inwardly extending discontinuous vented keys 64 extend inwardly from the webs 10 into the lower flute cavity 7. As such, in some embodiments, as illustrated in FIGS. 3D to 3G, the outwardly extending discontinuous vented keys 62 and the inwardly extending discontinuous vented keys 64 may alternate with each other such that adjacent sides 32, 72 of adjacent discontinuous vented keys 60 may form a vent 70 between the sides 72 (e.g., right or fourth side 79 of a first vented key and left or third side 78 of a second vented key) of adjacent discontinuous vented keys 60. The vents 70 in the decking may allow for quicker drying of the concrete (e.g., lightweight insulating concrete) when the concreate is poured on top of the decking. Venting may be required in order to control the rate at which the concrete dries, which may affect concrete shrinkage, cracking, strength, or the like. While FIGS. 3D through 3G illustrate that the vents 70 are located between the sides 72 of adjacent vented keys 60, the vents 70 may be located on other sides 72 of the vented keys 60 (e.g., an upper or first side 74 and/or a lower or second side 76 of the discontinuous key 30). For example, when there are multiple rows and/or columns of keys (e.g., continuous 22 and/or discontinuous 30) within a web 10 (e.g., as illustrated in FIGS. 4A-4C, or the like) the vents 70 may be located in any of the sides 32, 72 of the keys such that a vent may be formed between adjacent keys 20 and/or between a key 20 and the surface of the web 10. As such, the vents 70 may be located on any side of any discontinuous key 30, such that all of the discontinuous keys 30 have a vent 70, alternating discontinuous keys 30 have a vent 70, or the vents 70 are located in any pattern of discontinuous keys 60.

Moreover, it should be understood that the continuous keys 22 may also have vents 70 located on the upper or first side and/or the lower or second side of the continuous keys 22, and/or have a continuous key 22 with different depths such that vents 70 are formed therein (e.g., a continuous key with different depths of extension into the upper flute cavity 5 may result in vents where the depth of the continuous key 22 change).

Figure 4D:
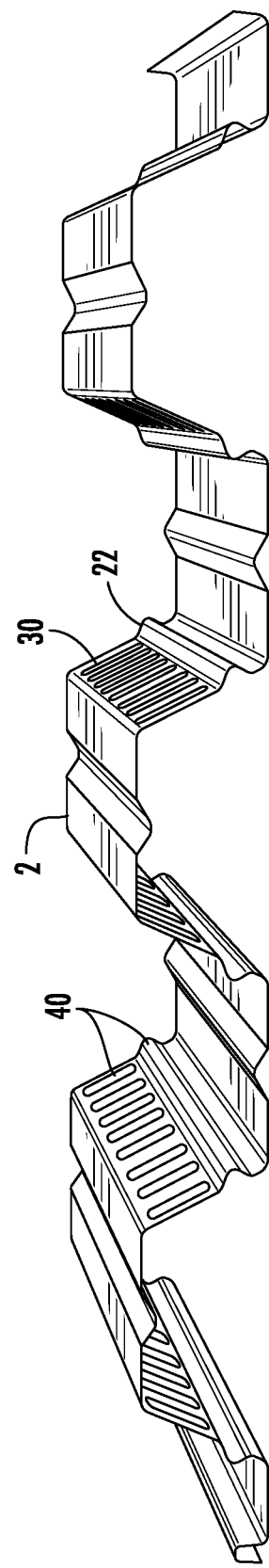
FIG. 4D illustrates decking having both discontinuous keys with heights longer than the lengths and continuous keys in two rows within the webs and extend longitudinally along the lengths of the webs, in accordance with some embodiments of the invention.
Figure 4E:
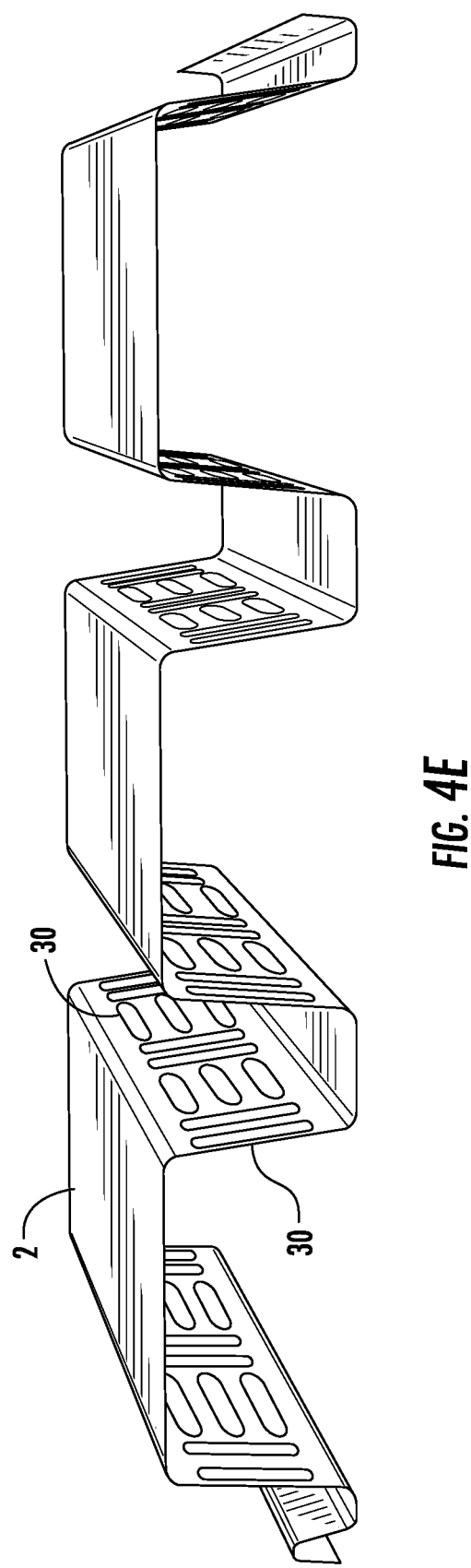
FIG. 4E illustrates decking having discontinuous keys with heights longer than the lengths that alternate with discontinuous keys with lengths longer than the heights, in accordance with some embodiments of the invention.
Figure 4F:
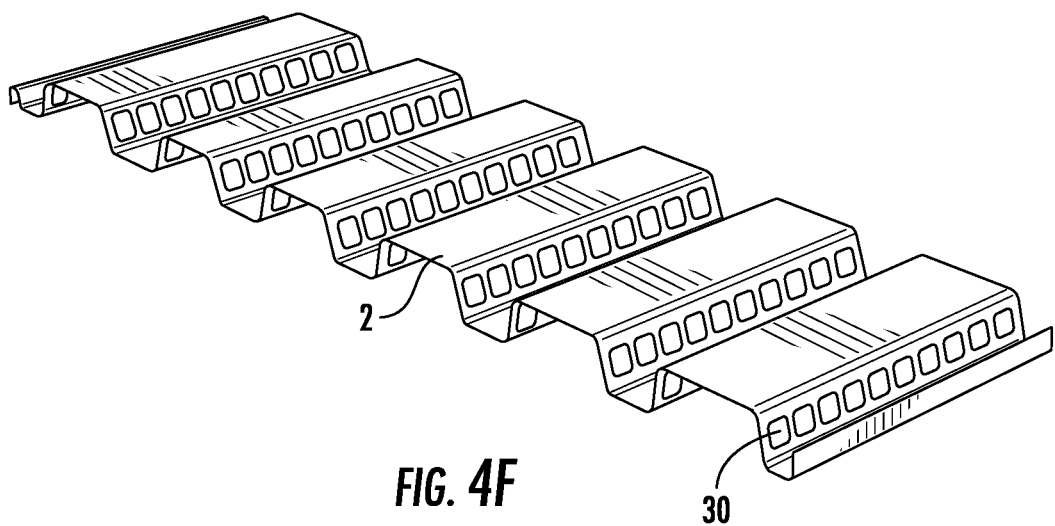
FIG. 4F illustrates decking having discontinuous keys with a generally square shape, in accordance with some embodiments of the invention.
Figure 4G:
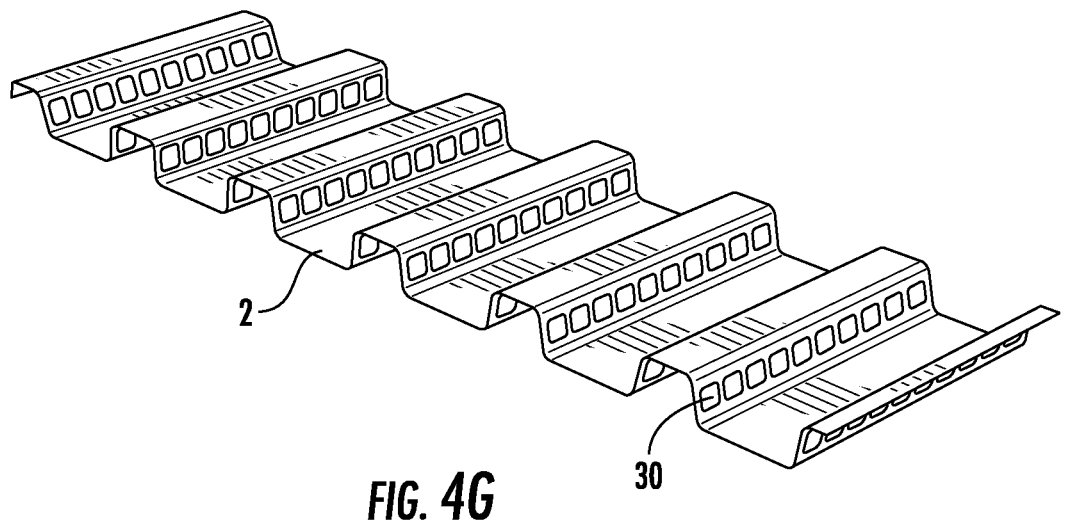
FIG. 4G illustrates decking having discontinuous keys with a generally square shape, in accordance with some embodiments of the invention.
Figure 4H:
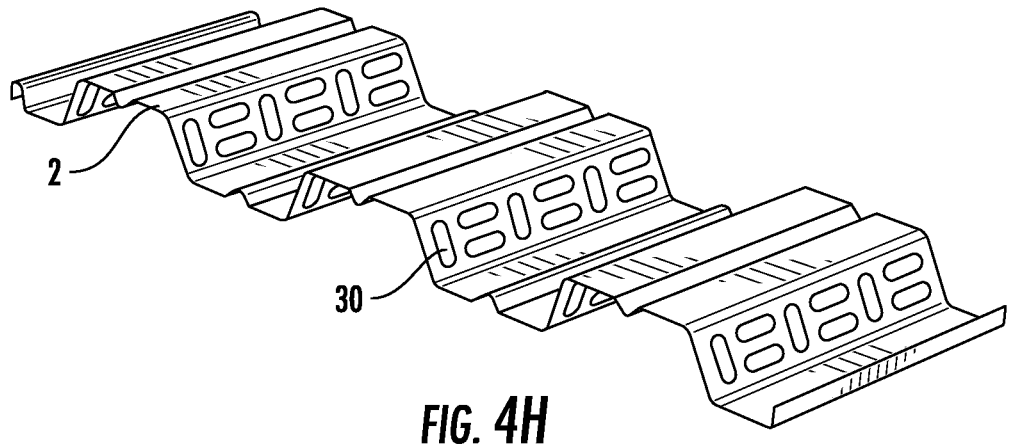
FIG. 4H illustrates decking having discontinuous keys in both the lateral and longitudinal directions, in accordance with some embodiments of the invention.
Figure 4I:
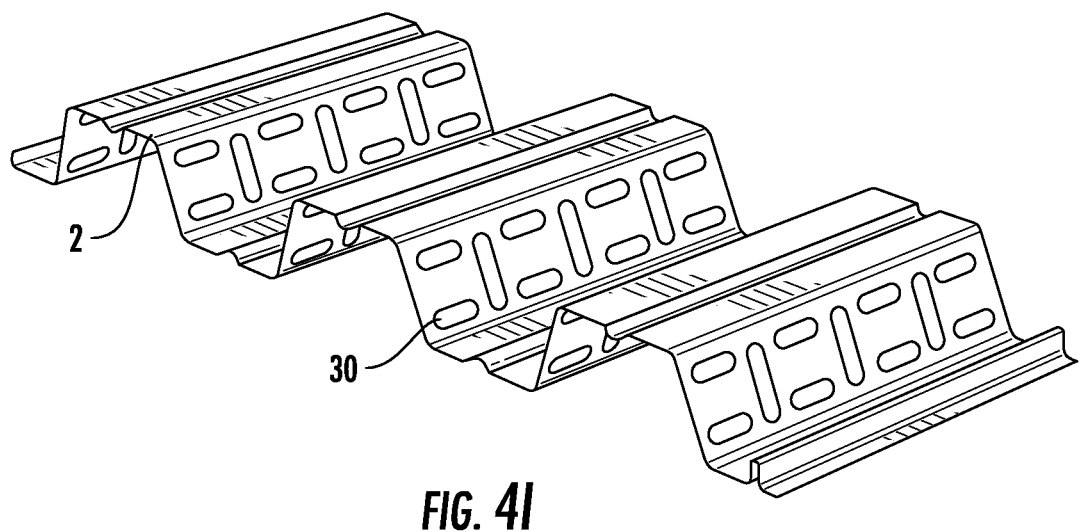
FIG. 4I illustrates decking having discontinuous keys in both the lateral and longitudinal directions, in accordance with some embodiments of the invention.

FIGS. 4A-4F illustrate some examples of the different embodiments of the decking 2 used in the present invention. As previously discussed above in FIGS. 3A-3B, the discontinuous keys 30 may be located in series in a single row 40 within the webs 10 of the decking 2. Alternatively, as illustrated in FIGS. 4A and 4B, there may be multiple rows 40 of discontinuous keys 30, such as two rows, as illustrated in FIG. 4A, or three rows, as illustrated in FIG. 4B. In some embodiments of the invention, as illustrated in FIG. 4C, there may be one or more rows 40 of discontinuous keys 30, as well as one or more rows 40 of continuous keys 22. In other embodiments, as illustrated in FIG. 4D, it should be understood that there may be one or more rows 40 of discontinuous keys 30 that have heights that are greater than the lengths of each discontinuous key 30 (e.g., laterally extending with respect to the webs). These discontinuous keys 30 may include a plurality located laterally (e.g., in a column configuration which is not illustrated) and/or located longitudinally (e.g., as illustrated in the row 40 in FIG. 4D). Moreover, the discontinuous keys 30 may be provided by themselves in each web, be located with other discontinues keys 30 that have lengths greater than heights (e.g., as illustrated in FIGS. 4A and 4B), and/or be located with continuous keys 22 (e.g., as illustrated in FIG. 4D). As illustrated in FIG. 4E, in some embodiments the discontinuous keys 30 may include alternating discontinuous keys 30 having heights 36 greater than the lengths 34, and discontinuous keys 30 having lengths 34 greater than heights 36. In some embodiments of the invention, as illustrated in FIGS. 4F and 4G, the discontinuous keys 30 may be square or generally square having heights 36 and lengths 34 that are the same or generally the same. In other embodiments of the invention, as illustrated in FIGS. 4H and 4I, the discontinuous keys 30 may alternate orientation and have a different number of keys in the alternating pattern (e.g., one lateral key then two longitudinal key).

Figure 4J:
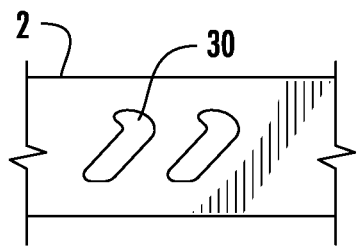
FIG. 4J illustrates decking having discontinuous keys that are generally v-shaped, in accordance with some embodiments of the invention.
Figure 4K:
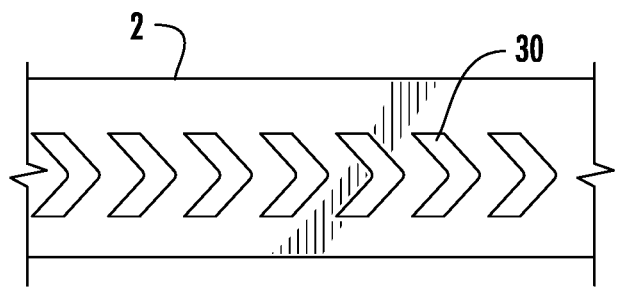
FIG. 4K illustrates decking having discontinuous keys that are v-shaped, in accordance with some embodiments of the invention.
Figure 4L:
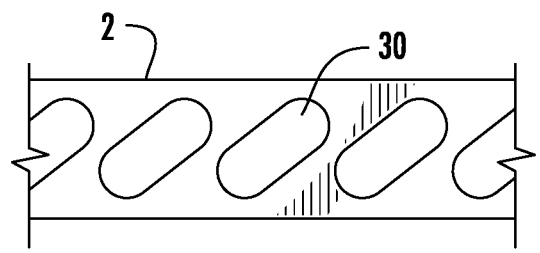
FIG. 4L illustrates decking having discontinuous keys that are generally oval and positioned diagonally, in accordance with some embodiments of the invention.
Figure 4M:
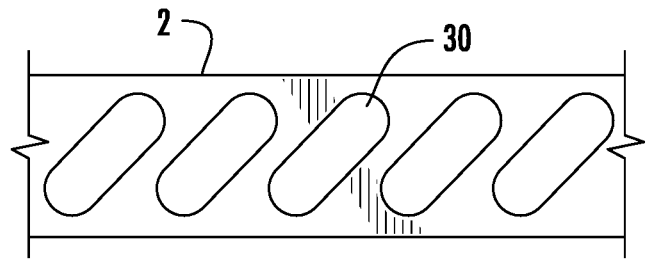
FIG. 4M illustrates decking having discontinuous keys that are generally oval and positioned diagonally and longer than the discontinuous keys of FIG. 4L, in accordance with some embodiments of the invention.
Figure 4N:
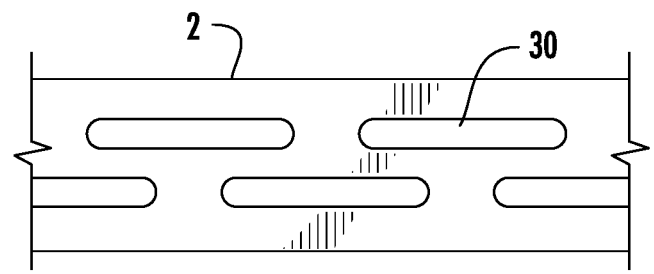
FIG. 4N illustrates decking having two rows of discontinuous keys that run longitudinally in an alternating pattern, in accordance with some embodiments of the invention.
Figure 4O:
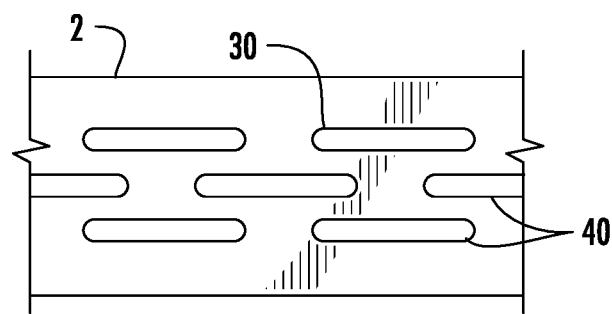
FIG. 4O illustrates decking having three rows of discontinuous keys that run longitudinally in an alternating pattern, in accordance with some embodiments of the invention.
Figure 4P:
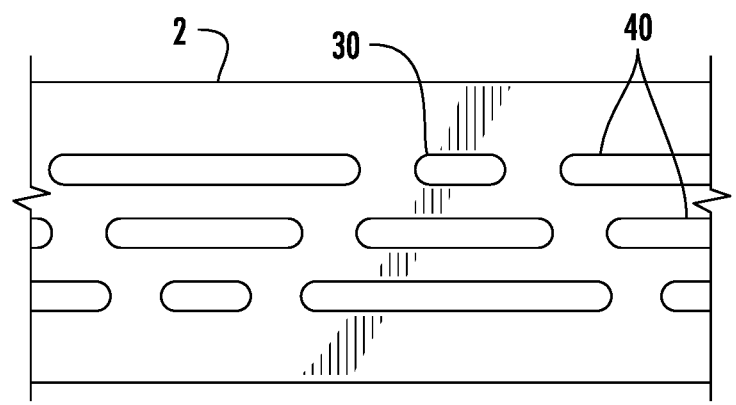
FIG. 4P illustrates decking having three rows of discontinuous keys that have different lengths and run longitudinally in an alternating pattern, in accordance with some embodiments of the invention.

It should be understood that the discontinuous keys 30 may be any shape and formed in any pattern. For example, FIGS. 4J and 4K illustrate discontinuous keys 30 that are v-shaped or generally v-shaped, and extend longitudinally (as illustrated), laterally, and/or diagonally within the webs 10. In another example, as illustrated in FIGS. 4L and 4M, the discontinuous keys 30 may be generally oval, and may extend longitudinally in a diagonal orientation along the length of the web 10. It should also be understood that as illustrated in FIGS. 4N, 4O, and 4P, the discontinuous keys 30 may be located in two or more rows, have keys of different lengths 36, and be spaced from each other in an offset pattern. It should be understood that the discontinuous keys 30 may have any shape, such as circular, oval, horseshoe, semi-circular, crescent, or any other like shape and may be located in one or more rows 40 and/or columns 42 within the webs of the decking 2. Moreover, different shapes, patterns (e.g., rows, columns), and orientations (e.g., vertical, longitudinal, diagonal, or the like) may be utilized.

Figure 5A:
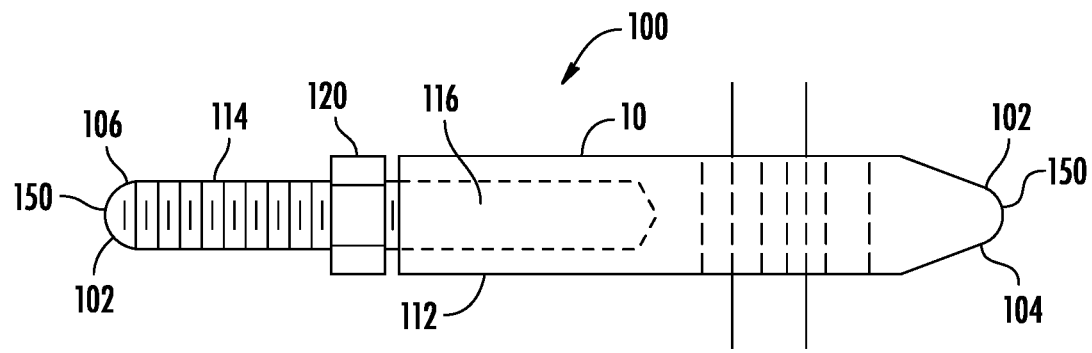
FIG. 5A illustrates side view of the decking hanger with an end having a rounded line connector, in accordance with some embodiments of the invention.
Figure 5B:
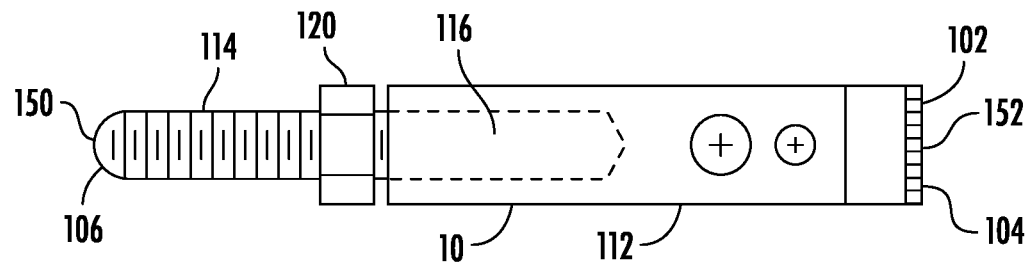
FIG. 5B illustrates bottom view of the decking hanger of FIG. 5A with an end having a rounded line connector, in accordance with some embodiments of the invention.
Figure 5C:
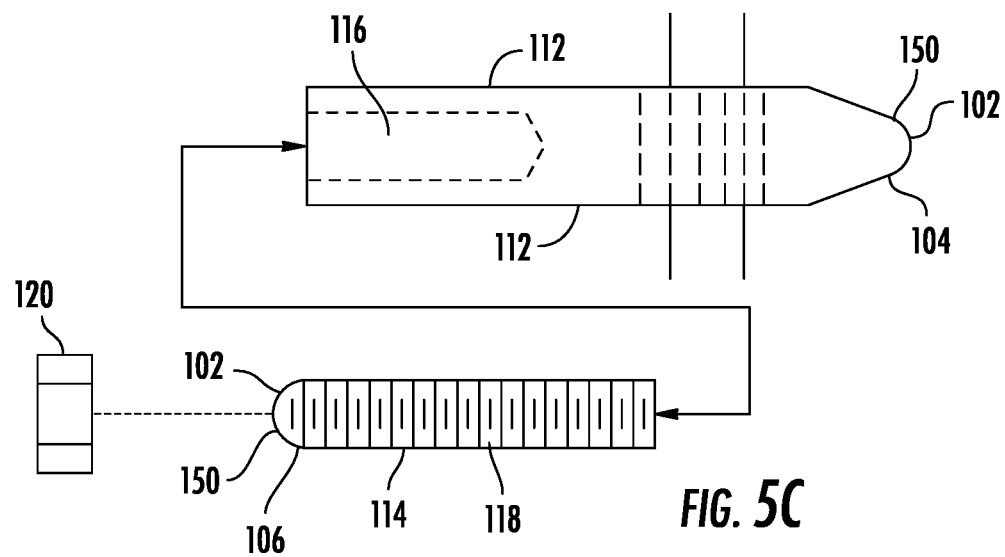
FIG. 5C illustrates a disassembled view of the decking hanger of FIGS. 5A and 5B, in accordance with some embodiments of the invention.

It should be understood that regardless of the shape or location of the keys 20, different decking hangers 50 may be utilized. As illustrated in FIGS. 5A-5C the decking hanger 50 may be a strut hanger 100 type. The strut hanger 100 may have ends 102 and a rigid body 110. The ends 102 may include a first end 104 and a second end 106. Moreover, it should be understood that each end 102 may have one or more connectors 150, as will be described in further detail later. The body 110 may be a single body or may include two or more portions, either of which may operate to allow the strut hanger 102 to expand and retract for installation and removal from the decking 2 (e.g., from the keys 20 within the decking 2). As will be discussed in further detail, the body 110 may have an adjustment 140 which may allow for extending or retracting, such as through the use of rotation (e.g., bolt that is rotated), slide and lock feature, pivoting, flexing, or the like.

As illustrated in FIGS. 5A-5C, in some embodiments the strut hanger 100 may be a fastener type strut hanger 100 having a first portion 112 and a second portion 114 that are moveable with respect to each other. For example, the first portion 112 may be, or may include, a female portion 116, such as an aperture that receives a fastener. As such, the second portion 114 may be, or may include, a male portion 118, such as a threaded portion that is operatively coupled to the first portion 112. The length of the strut hanger 100 may be adjusted by rotating the first portion 112 and the second portion 114 with respect to each other. The strut hanger 110 may further comprise one or more stops 120, such as one or more nuts, or one or more other stops, that would inhibit (e.g., prevent, reduce the chance of, or the like) the first portion 112 from moving with respect to the second portion 114 (e.g., rotating, or the like).

Figure 6A:
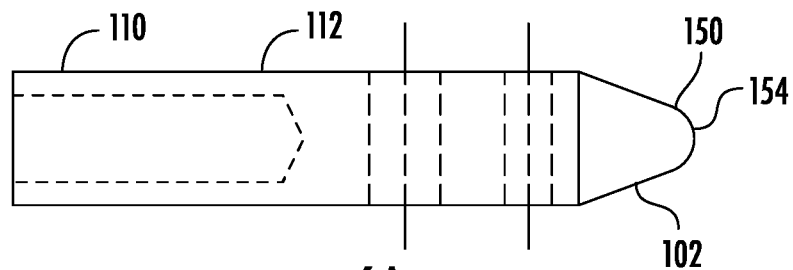
FIG. 6A illustrates side view of a portion of the decking hanger with an end having a rounded conical connector, in accordance with some embodiments of the invention.
Figure 6B:
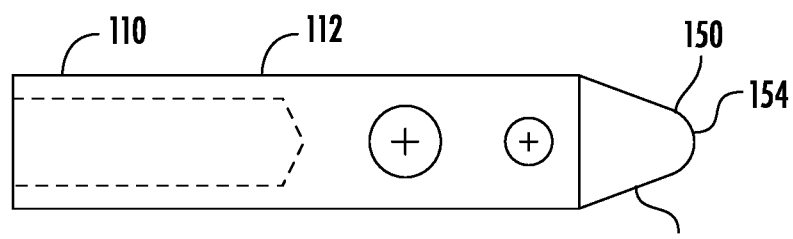
FIG. 6B illustrates bottom view of a portion of the decking hanger of FIG. 6A with an end having a rounded conical connector, in accordance with some embodiments of the invention.
Figure 6C:
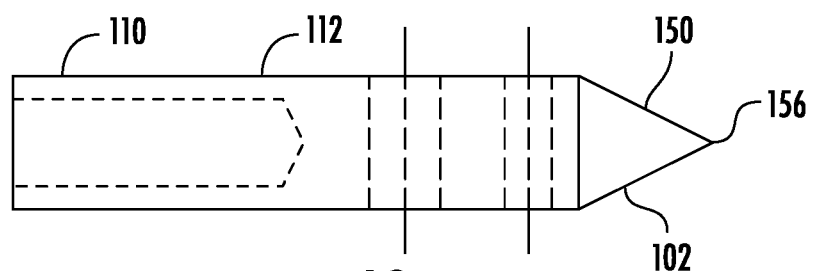
FIG. 6C illustrates side view of a portion of the decking hanger with an end having a pointed conical connector, in accordance with some embodiments of the invention.
Figure 6D:
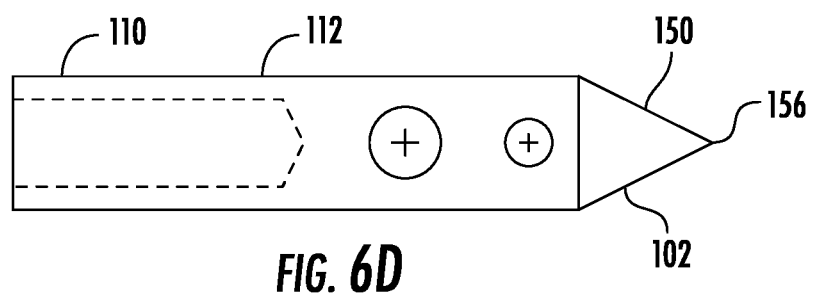
FIG. 6D illustrates bottom view of a portion of the decking hanger of FIG. 6C with an end having a pointed conical connector, in accordance with some embodiments of the invention.
Figure 6E:
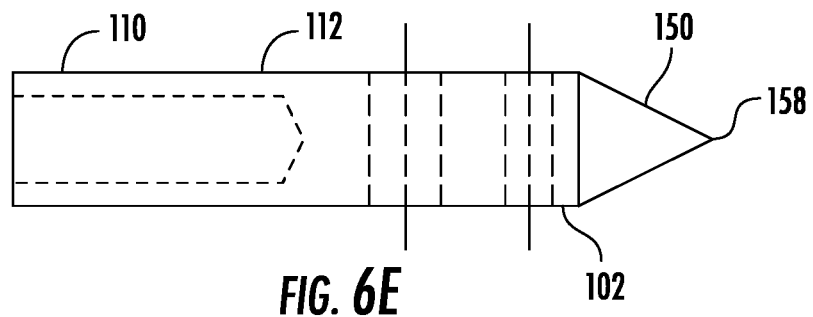
FIG. 6E illustrates side view of a portion of the decking hanger with an end having a pointed edge, in accordance with some embodiments of the invention.
Figure 6F:
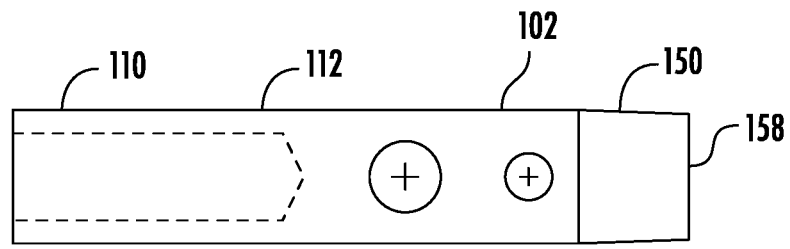
FIG. 6F illustrates bottom view of a portion of the decking hanger of FIG. 6E with an end having a pointed edge, in accordance with some embodiments of the invention.
Figure 6G:
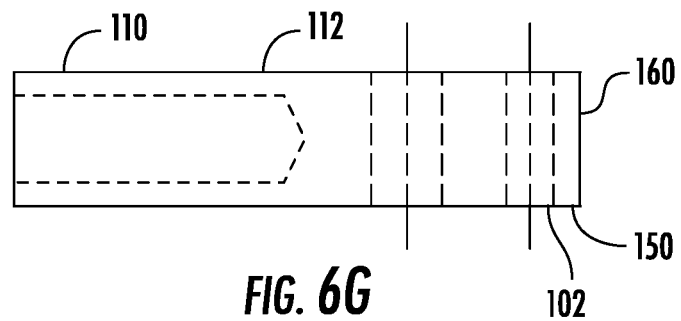
FIG. 6G illustrates side view of a portion of the decking hanger with an end having a flat connector, in accordance with some embodiments of the invention.
Figure 6H:
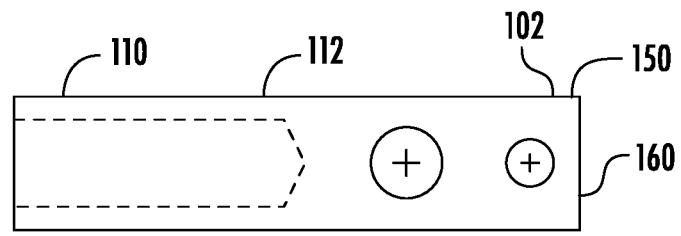
FIG. 6H illustrates bottom view of a portion of the decking hanger of FIG. 6H with an end having a flat connector, in accordance with some embodiments of the invention.
Figure 6I:
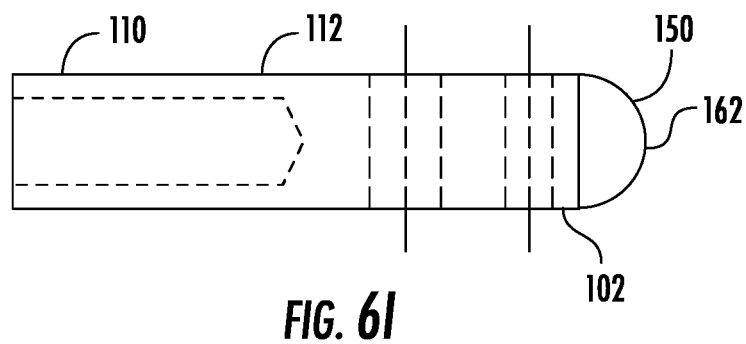
FIG. 6I illustrates side view of a portion of the decking hanger with an end having a hemispherical connector, in accordance with some embodiments of the invention.
Figure 6J:
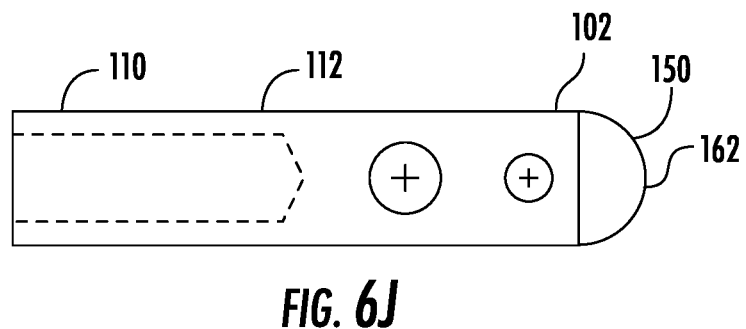
FIG. 6J illustrates bottom view of a portion of the decking hanger of FIG. 6I with an end having a hemispherical connector, in accordance with some embodiments of the invention.

FIGS. 5A-5C and 6A-6J, illustrate different embodiments of the invention that provide different shapes for the connectors 150, 250 at the ends 102 of the strut hanger 100, or at the ends 202 of the flexible hanger 200 discussed later. As illustrated in FIGS. 5A-5C at least one of the ends 102 may include rounded line connectors 152. Alternatively, as illustrated in FIGS. 6A and 6B, at least one of the ends 102 of the strut hanger 100 may include a rounded conical connector 154. As illustrated in FIGS. 6C and 6D, at least one of the ends 102 of the strut hanger 100 may include a pointed conical connector 156. As illustrated in FIGS. 6E and 6F, at least one of the ends 102 of the strut hanger 100 may include an edge connector 158. As illustrated in FIGS. 6G and 6H, at least one of the ends 102 of the strut hanger 100 may include a flat connector 160. As illustrated in FIGS. 6I and 6J, at least one of the ends 102 of the strut hanger 100 may include a hemispherical connector 162. It should be understood that in other embodiments of the invention the strut hangers 100 may have different shapes at different ends (e.g., one connector 150 shape on a first end 104 and a different connector 150 shape on a second end 106). In some embodiments, the flexible hanger 200 may have the same or similar connectors 150, 250 on the ends 102, 202.

Figure 7A:
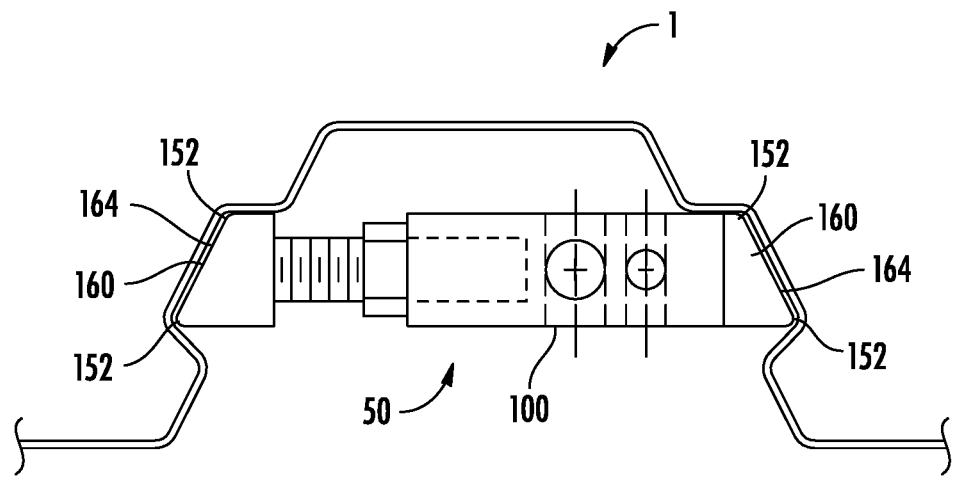
FIG. 7A illustrates a side view of a hanger system with a hanger having two ends both having a flat and rounded line connector combination, in accordance with some embodiments of the invention.
Figure 7B:
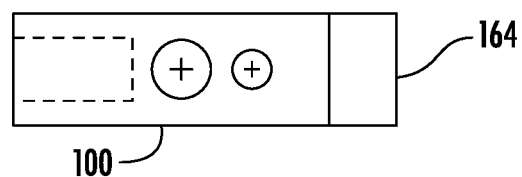
FIG. 7B illustrates a bottom view of a portion of the hanger from FIG. 7A having an end with a flat and rounded line connector combination, in accordance with some embodiments of the invention.
Figure 7C:
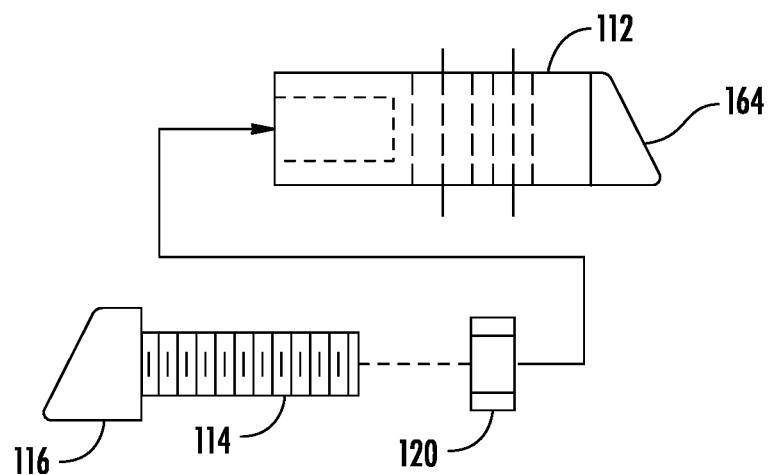
FIG. 7C illustrates a side view of a disassembled hanger from FIG. 7A having two ends both having a flat and rounded line connector combination, in accordance with some embodiments of the invention.
Figure 8A:
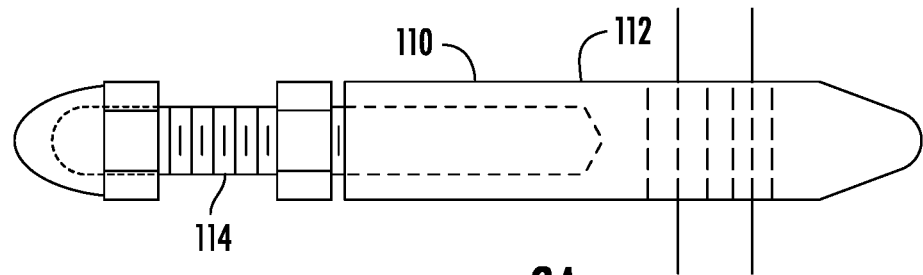
FIG. 8A illustrates a side view of a hanger system with a hanger having two ends both having the same rounded line connector, in accordance with some embodiments of the invention.
Figure 8B:
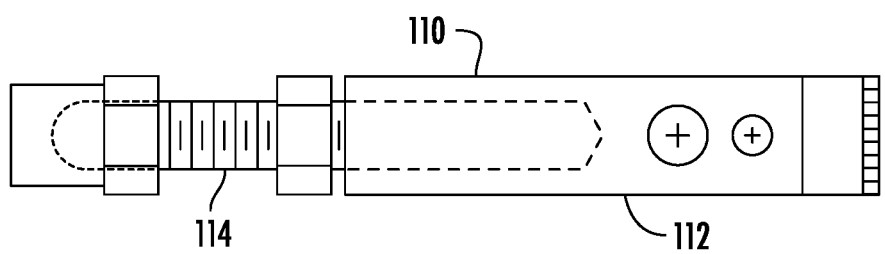
FIG. 8B illustrates a bottom view of the hanger from FIG. 8A having two ends both having the same rounded line connector, in accordance with some embodiments of the invention.
Figure 8C:
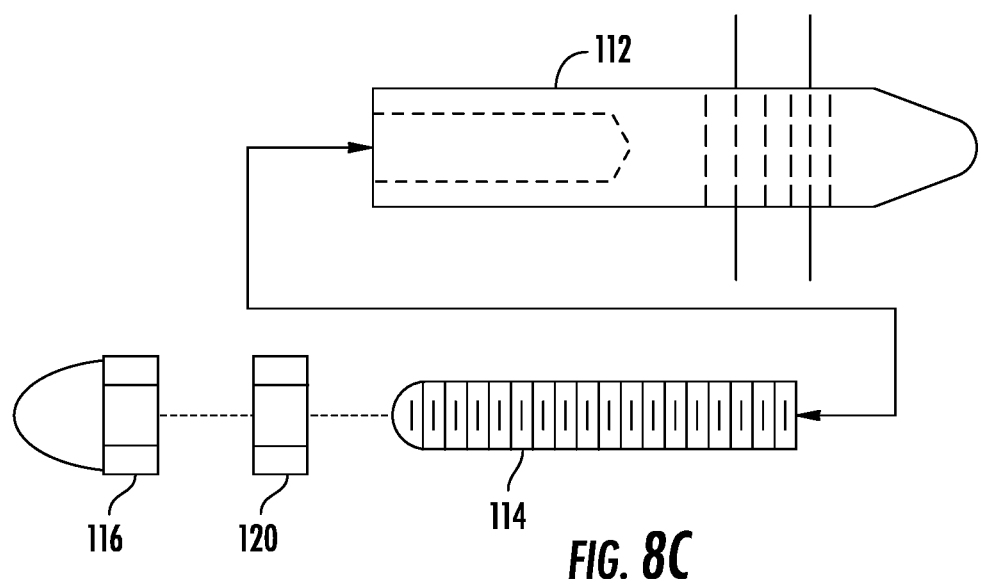
FIG. 8C illustrates a side view of a disassembled hanger from FIG. 7A having two ends both having the same rounded line connector, in accordance with some embodiments of the invention.
Figure 9A:
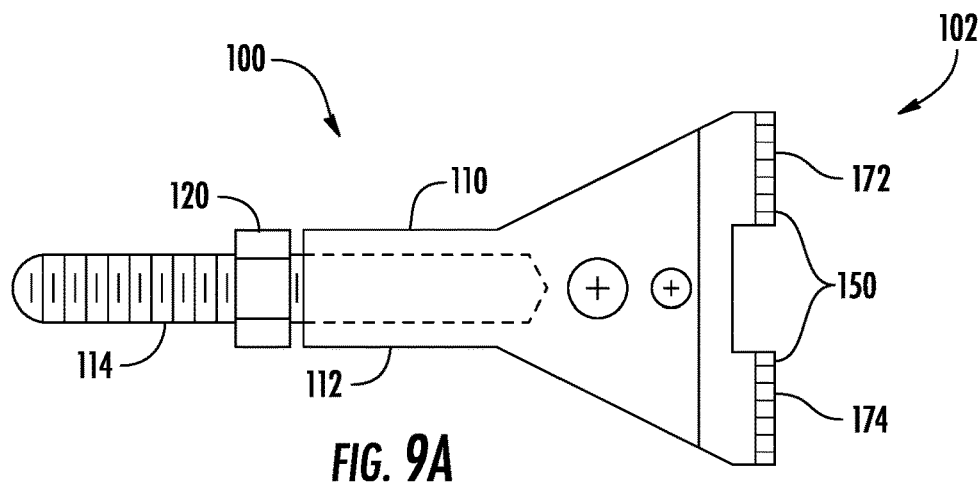
FIG. 9A illustrates a top view of a decking hanger with a first end having multiple rounded line connectors, in accordance with some embodiments of the invention.
Figure 9B:
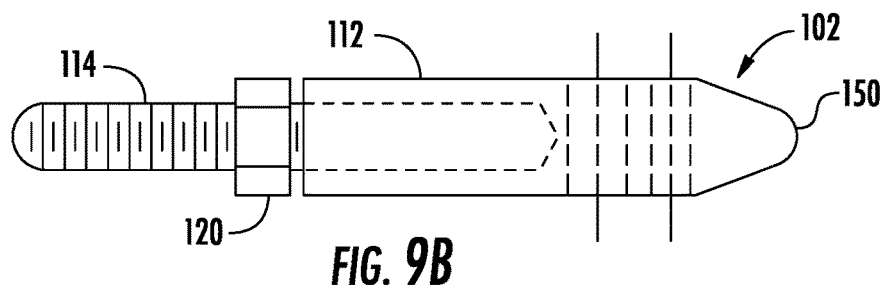
FIG. 9B illustrates side view of the decking hanger of FIG. 9A with a first end having multiple rounded line connectors, in accordance with some embodiments of the invention.
Figure 10A:
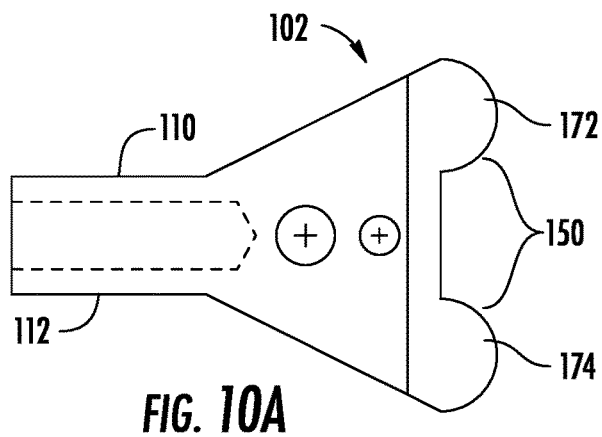
FIG. 10A illustrates a top view of a decking hanger with a first end having multiple hemispherical connectors, in accordance with some embodiments of the invention.
Figure 10B:
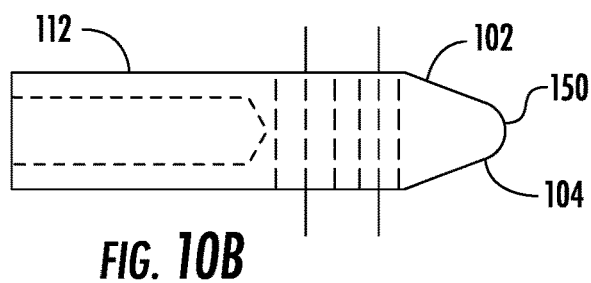
FIG. 10B illustrates side view of the decking hanger of FIG. 10A with a first end having multiple hemispherical connectors, in accordance with some embodiments of the invention.

In some embodiments of the invention, FIGS. 7A-7C illustrate that the ends 102 may include angled connectors 164, and/or a combination of different connectors 150 at the ends 102 of the hangers 50 (e.g., flat portions, rounded line portions, or the like). These angled connectors 164 may allow for operatively coupling with keys 50 having an angled configuration. Moreover, as illustrated in FIGS. 7A-7C and FIGS. 8A-8D, in some embodiments the body 110 may include a second portion 114 that is operatively coupled to a third portion 116. The third portion 116 may be integral with, or be assembled to (e.g., removable from), the second portion 114. As such, the third portion 116 may create an end 102 (e.g., second end 106) that has the same shape and size as the opposing end 102 (e.g., a first end 104). As such, it should be understood that any hanger 50 (e.g., strut hanger 100, flexible hanger 200, or the like) may have any type of connector 150 of any shape on any end 102, including different shapes on opposite ends 102 and/or on the multiple connectors 150 on the same end 102. Moreover, it should be understood that the connectors 150 may be integrally operatively coupled with the hanger 50 and/or a portion of the hanger 50 and/or removably operatively coupled with the hanger 50 and/or a portion of the hanger 50 (e.g., a separate portion, such as a nut with a connector formed therewith, or the like).

It should be understood that regardless of the shape of the connectors 150 of the ends 102, the connectors 150 may conform to the shape of the keys 20, as described previously herein, or having any other key shape not specifically described herein. As such, in some embodiments of the invention there may be a surface to surface contact over at least a portion of, and in some cases the entire surface, of the connectors 150 at the ends 102 of the hangers 50. For example, the connectors 150 at the ends 102 of the strut hangers 100 (or the flexible hangers 200 discussed later) may mate with the surfaces (e.g., bend radii, or the like) of the keys 20 of the decking 2. In some embodiments of the invention, the use of radiused and/or spherical ends provides superior engagement due to increased contact area and a profile more consistent with the formed shape of the keys 30, as compared to hangers with edges (e.g., chisel ends) or pointed ends, which may cause high stress concentrations compared to radiused or spherical ends. Moreover, forming keys in decking 2 that have edges (e.g., pointed embossments) and/or points (e.g., conical points) may prove difficult because such shapes may result in punctures in the decking 2 during formation (e.g., during roll forming). Moreover, the edges and/or pointed connectors 150 at the ends 102 of the strut hanger 100 may puncture the decking during assembly, and potentially disturb the concrete, which may cause assembly issues that will be described in further detail later herein.

FIGS. 9A, 9B, 10A, and 10B illustrate additional embodiments in which one or both ends 102 of the hangers (e.g., the strut hangers 100) have multiple connectors 150 (e.g., a first connector 172, a second connector 174, a third connector, a fourth connector, or the like). As illustrated by FIGS. 9A-10B, the ends 102 with two or more connectors 150 may be operatively coupled to the different keys 20 in different orientations. For example, the two or more connectors 150 may be orientated parallel with the longitudinal direction of the flutes 4 in the decking 2, and thus parallel with the continuous keys 22 and/or the discontinuous keys 30 running longitudinally along the length of the webs 10. Alternatively, in other embodiments the two or more connectors 150 may be oriented perpendicular with the longitudinal direction of the flutes 4 in the decking 2, and thus, perpendicular with the continuous keys 22 and/or the discontinuous keys 30 running longitudinally along the length of the webs 10 (such orientation is not illustrated). As such, in the configurations where the two or more connectors 150 are oriented perpendicular with the longitudinal direction of the flutes 4, the two or more connectors may be offset from one another to account for the angled webs, and thus, the different locations of the keys 20 within the webs in the X-direction and/or with respect to different depths of keys 20 in the same web. As described herein, utilizing an end with two or more connectors 150 may improve resistance to forces in multiple directions, reduce or eliminate the potential for the hangers 50 becoming dislodged, and/or resist or prevent rotation of the hangers 50.

It should be understood that in some embodiments, each end of the hangers 50 (e.g., a first end and a second end) may comprise the two or more connectors. Furthermore, the two or more connectors on the first end may be in the same plane or in a different plane as the two or more connectors on the second end. That is, at least one of the two or more connectors on the first end may be in a different plane as at least one of the two or more connectors on the second end. Moreover, in some embodiments the first end and/or the second end may comprise three or more connectors, and the three or more connectors may be in the same plane (e.g., three in a row) or at least one connector of the three or more connectors may be out of plane with the other connectors (e.g., triangle configuration, square configuration, or the like).

Figure 11:
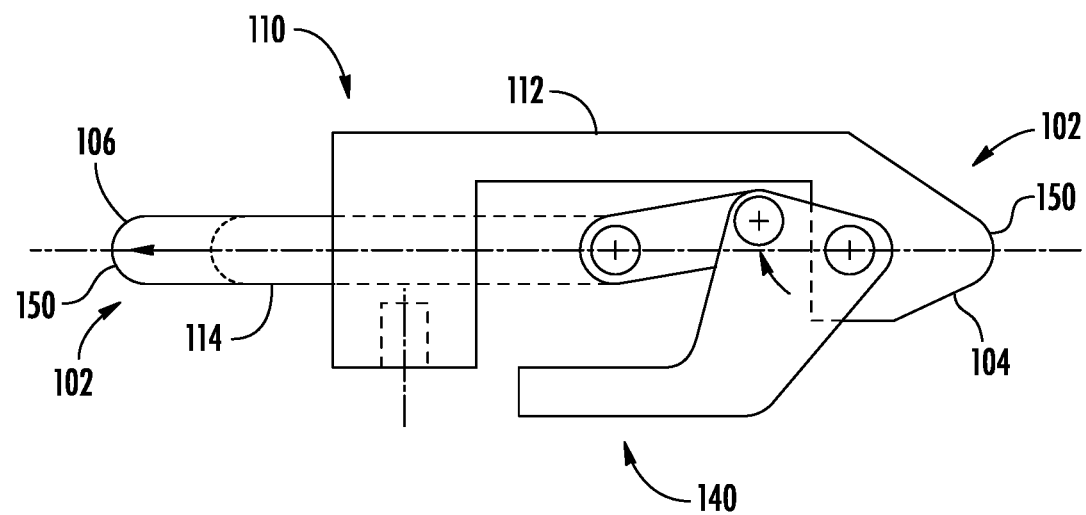
FIG. 11 illustrates a side view of the decking hanger having a quick connect and disconnect lever, in accordance with some embodiments of the invention.
Figure 12A:
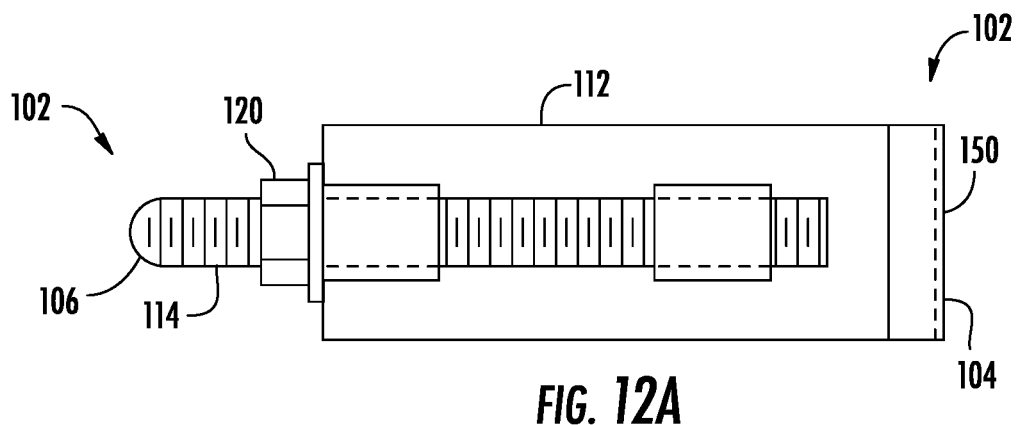
FIG. 12A illustrates a top view of a decking hanger having a strut portion and a flexible portion, in accordance with some embodiments of the invention.
Figure 12B:
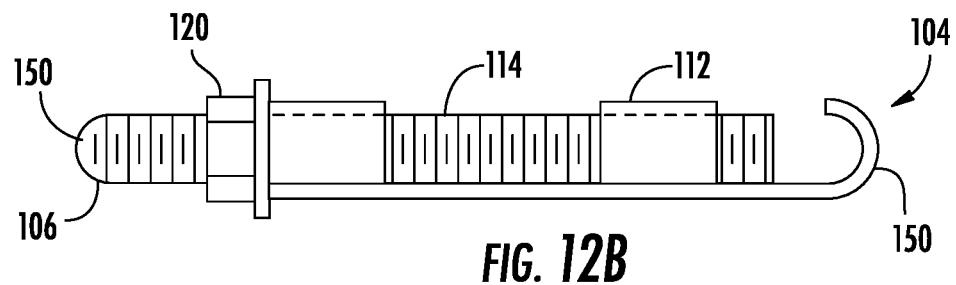
FIG. 12B illustrates a side view of the decking hanger of FIG. 12A having a strut portion and a flexible portion, in accordance with some embodiments of the invention.
Figure 12C:
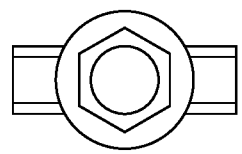
FIG. 12C illustrates an end view of the decking hanger of FIG. 12A having a strut portion and a flexible portion, in accordance with some embodiments of the invention.
Figure 12D:
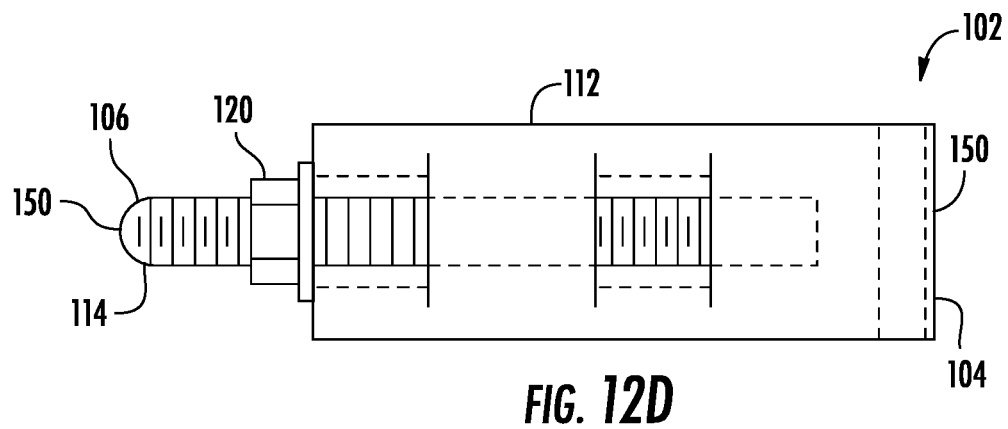
FIG. 12D illustrates a bottom view of the decking hanger of FIG. 12A having a strut portion and a flexible portion, in accordance with some embodiments of the invention.

FIG. 11, illustrates a different embodiment of the strut hanger 100, which includes a rigid body 110 with and adjustment 140 that comprises a mechanical lever. For example, the mechanical lever may allow for extending and retracting a rod and a locking mechanism, such as for example an over center cam that would extend a rod relative to the body 110 thus moving ends 102 of the body 110 outwardly to be operatively coupled with the keys 20 of the decking 2. This embodiment of the invention may have any of the connectors 150 discussed herein (e.g., of any size, shape, and number of connectors) at the ends 102.

FIGS. 12A through 12D illustrate some embodiments of the invention wherein the strut hanger 100 is made from a second portion 114 comprising a rigid body, such as a fastener (e.g., threaded bolt, or the like) that is operatively coupled to a first portion 112 that is a flexible body (e.g., a sheet metal body, or the like). It should be understood that the flexible body may be stamped, rolled, formed, extruded, or the like. In some embodiments, the first portion 112 may also have a female portion 116, such as a nut that is used for operative coupling with the second portion 114 (e.g., a male portion 118 that is threaded). The second portion 114 may be adjustable with respect to the first portion 112 in order to allow the end 102 of the strut hanger 100 to extend to engage the keys 20 of the deking 2. As previously discussed with respect to FIGS. 9A-10B, the embodiments illustrated in FIG. 12A-12D may have one or more ends 102 with one or more connectors 150. Moreover, the shapes of the connectors 150 of the ends 102 may be any shape discussed herein (or any other shape not discussed herein).

Figure 13A:
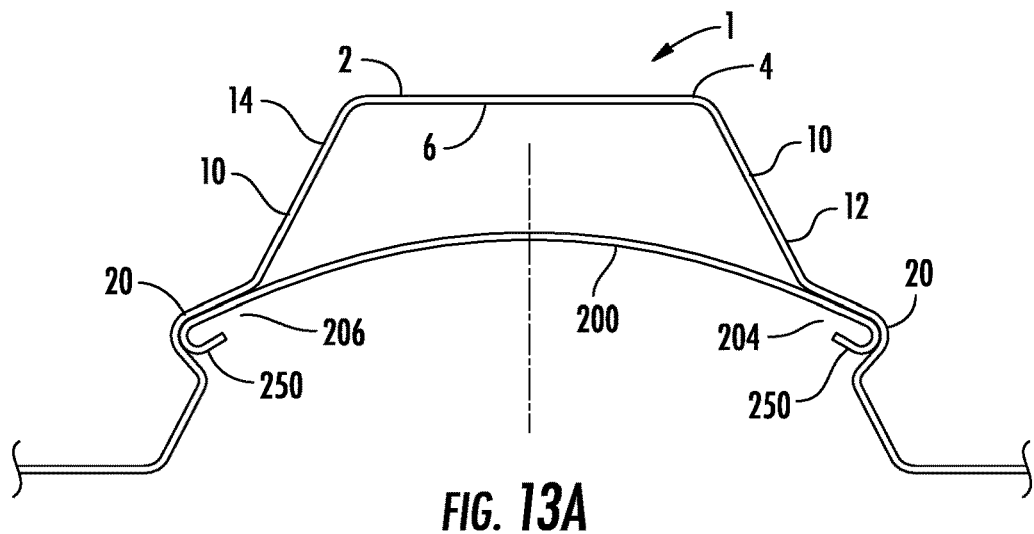
FIG. 13A illustrates a side view of a decking hanger system having a flexible decking hanger, in accordance with some embodiments of the invention.
Figure 13B:
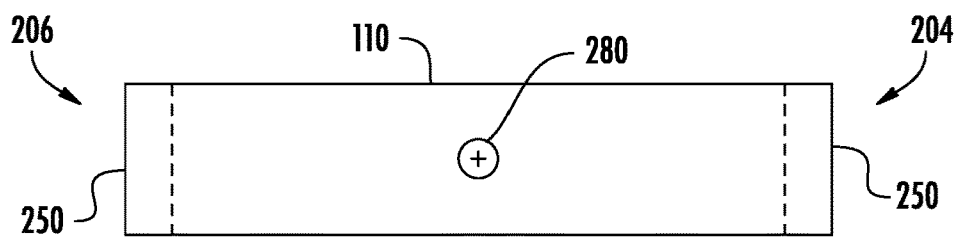
FIG. 13B illustrates top view of the decking hanger of FIG. 13A, in accordance with some embodiments of the invention.
Figure 13C:
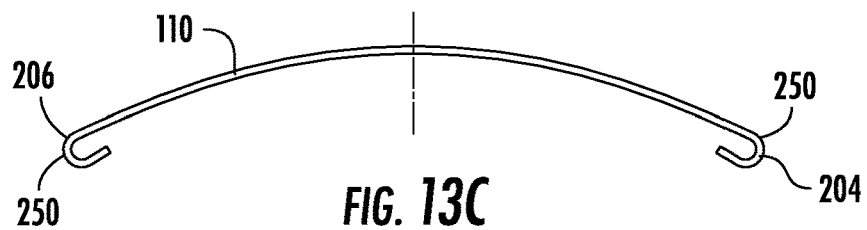
FIG. 13C illustrates side view of the decking hanger of FIG. 13A, in accordance with some embodiments of the invention.
Figure 14A:
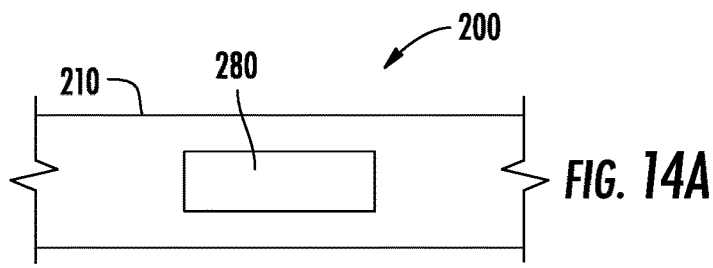
FIG. 14A illustrates top view of an alternate embodiment a decking hanger for FIG. 13A, in accordance with some embodiments of the invention.
Figure 14B:
FIG. 14B illustrates side view of the alternate embodiment of a decking hanger for FIG. 13A, in accordance with some embodiments of the invention.

FIGS. 13A-13C illustrate another embodiment of the hanger system 1 and hanger 100, such as a flexible hanger 200. The flexible hanger 200 may have ends 202 and/or connectors 250 that are the same as the ends 102 and/or connectors 150 discussed previously herein. In some embodiments of the invention the flexible hanger 200 may be an arc shaped spring. The flexible hanger 200 may be manufactured from a sheet spring steel or similar material with suitable elasticity to be pressed into the decking 2 compressing the arc that would then press outward on the keys 20 of the decking 2. In some embodiments of the invention, as illustrated in FIGS. 14A and 14B, the flexible hanger 200 may comprise an aperture 280, which is a threaded opening, a stamped opening, or the like in order to allow elements to hang from the flexible hanger 200.

Figure 15A:
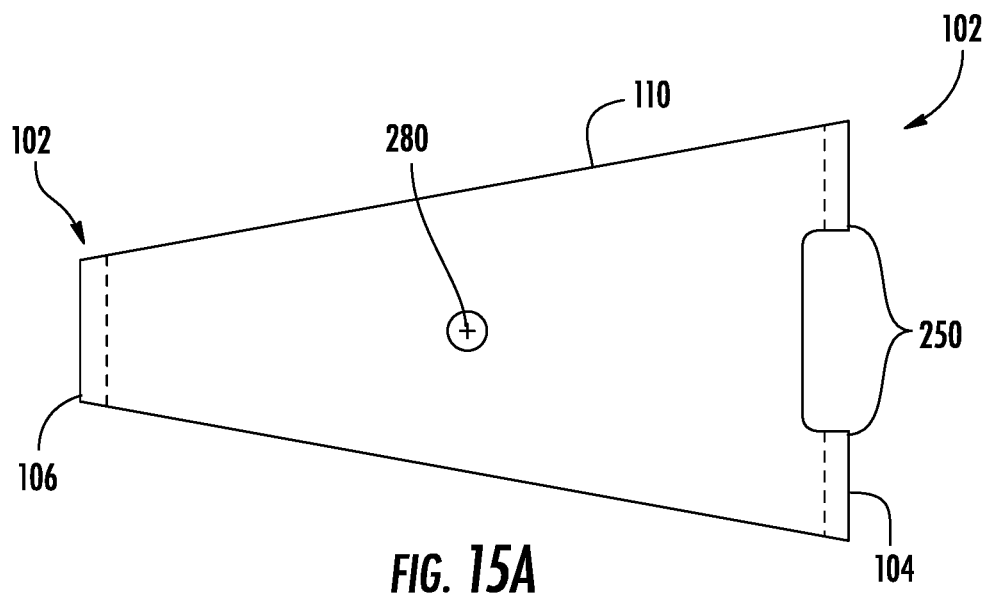
FIG. 15A illustrates a top view of a decking hanger bracket with a first end having multiple connectors, in accordance with some embodiments of the invention.
Figure 15B:
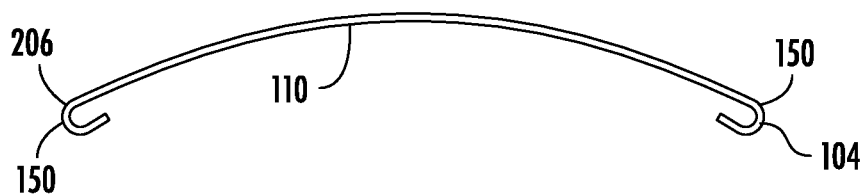
FIG. 15B illustrates side view of the decking hanger bracket of FIG. 15A with a first end having multiple connectors, in accordance with some embodiments of the invention.

FIGS. 15A and 15B illustrate another embodiment of the flexible hanger 200 in which at least one end 202 of the flexible hanger 200 may have two or more connectors 250. Moreover, the shapes of the connectors 250 of the ends 102 of the flexible hanger 200 may be any shape discussed herein (or not specifically discussed herein).

As illustrated in FIGS. 16A-17B, in some embodiments of the invention the flexible hanger system 1 may include a flexible hanger 200 with a body 210 having a first portion 212 and a second portion 214. In some embodiments the first portion 212 is located above the second portion 214 when installed within the hanger system 1. As illustrated in FIGS. 16A-17B, in some embodiments the first portion 212 and the second portion 214 may form a shape that is approximately diamonded shaped. However, it should be understood that the shape may be any shape such as oval (e.g., formed by two arcs), circular (e.g., formed by two hemispherical shaped portions), triangular (e.g., formed by a first bent portion and a second straight portion, or vice versa), hemispherical (e.g., formed by a first arc or hemispherical portion and a straight second portion, or vice versa), in other embodiments of the invention the first portion 212 and the second person 214 may be any uniform or non-uniform shape.

Figure 16A:
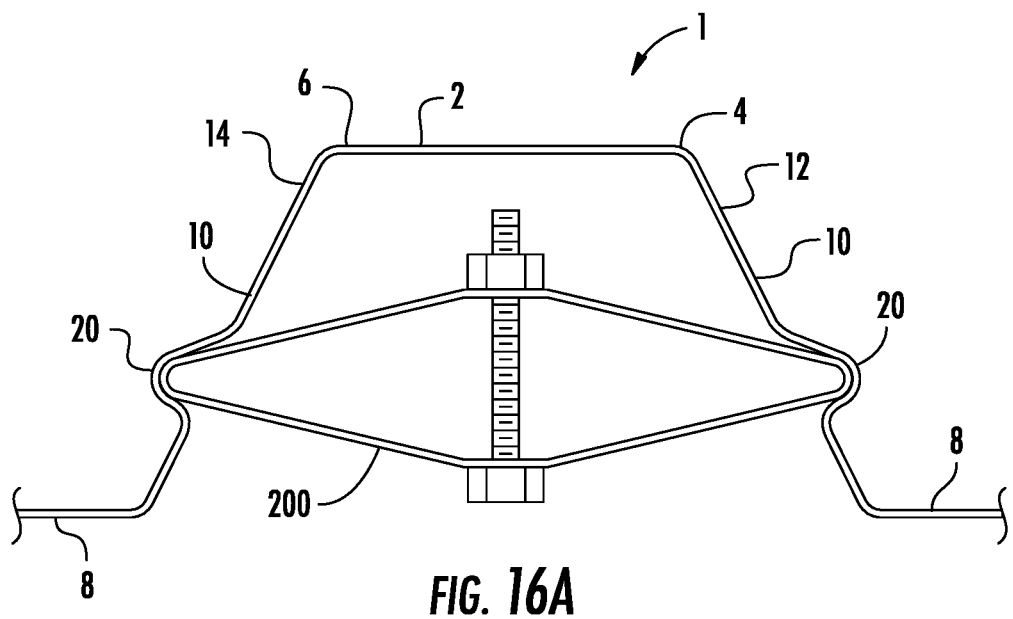
FIG. 16A illustrates a side view of a decking hanger system with a decking hanger having upper and lower portions, in accordance with some embodiments of the invention.
Figure 16B:
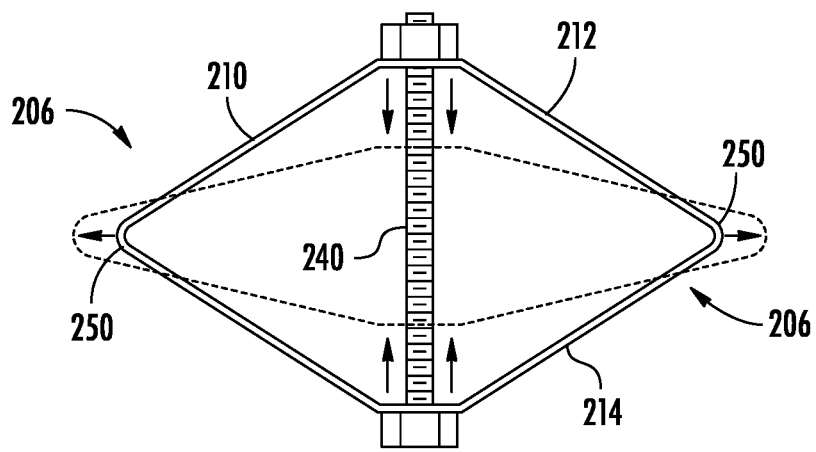
FIG. 16B illustrates a side view of the decking hanger bracket of FIG. 16A having upper and lower portions, in accordance with some embodiments of the invention.
Figure 16C:
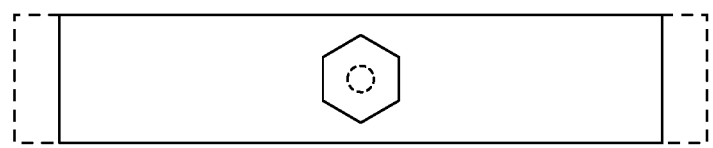
FIG. 16C illustrates a bottom view of the decking hanger bracket of FIG. 16B having upper and lower portions, in accordance with some embodiments of the invention.

As illustrated in FIGS. 16B and 16C, the flexible hanger 200 may have an adjustment 240 that allows the first portion 212 and/or second portion 216 to move relative to each other to expand and/or retract the ends 202 of flexible hanger 1 for engagement of the connectors 250 with the keys 20. In some embodiments, the first portion 212 and the second portion 214 have apertures 280 there through and/or a female portions 216 (e.g., a nut, or other internally threaded portion). A male portion 218 (e.g., a bolt, or other externally threaded feature) may be operatively coupled with the female portions 216. The male portion 218 may be rotated in order to draw at least a portion of the first portion 212 of the flexible hanger 200 and at least a portion of the second portion 214 of the flexible hanger 200 towards each other in order to extend the ends 202 of the flexible hanger 200 outwardly to allow the surfaces of the connectors 250 to be operatively coupled with the keys 20 of the decking 2, as previously discussed herein. In other embodiments of the invention, the adjustment 240 may include a wire, spring, lever, or the like that when compressed or actuated would force the connectors 250 of the ends 202 (e.g., corners, or the like) of the flexible hanger 200 (e.g., diamond hanger, or other shaped hanger) outwardly, thus engaging the keys 20 in the decking 2.

Figure 17A:
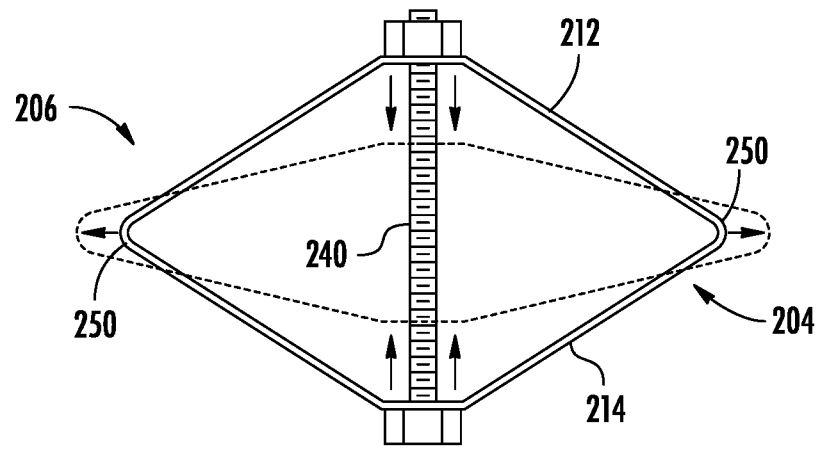
FIG. 17A illustrates a side view of a decking hanger bracket with a first end having multiple connectors, in accordance with some embodiments of the invention.
Figure 17B:
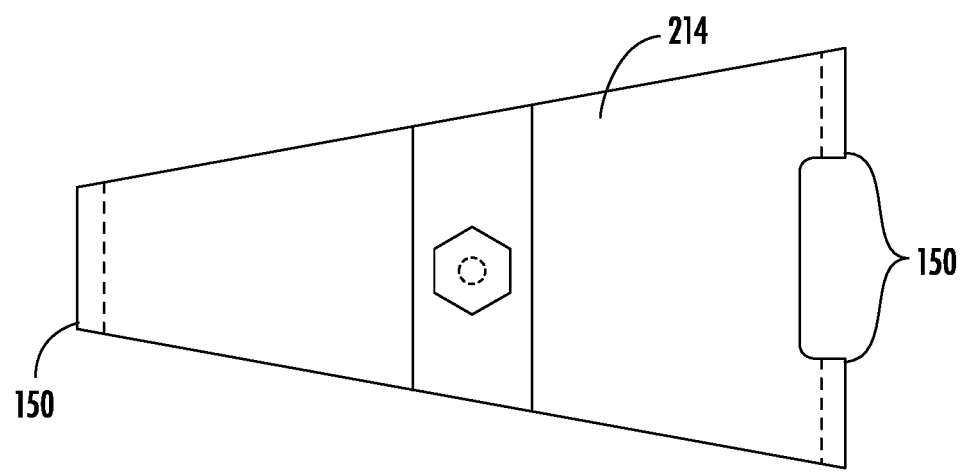
FIG. 17B illustrates a bottom view of the decking hanger bracket of FIG. 17A with a first end having multiple connectors, in accordance with some embodiments of the invention.

Moreover, as illustrated by FIGS. 17A and 17B, one or more ends 202 of the flexible hanger 200 may have two or more connectors 250 (e.g., a first connector 272, a second connector 274, or the like) that are used for operatively coupling with the keys 20 of the decking 2 at two locations on a web 10, as previously described herein.

It should be understood that the components operatively coupled to the hangers 50, and thus the load resisted by the hangers 50, may be operatively coupled to the hangers 50 by various couplings, such as mechanical, welding, chemical adhesive, combinations thereof, or the like. The embodiments illustrated herein provide apertures 180, 280 in the hangers 50 having a female portion (e.g., threaded aperture) that receives a male portion (e.g., threaded bolt). However, it should be understood that the components may be coupled to the hangers 50 in any mechanical way. For example, the male portion may be integral with the hangers 50. Alternatively, wires may be coupled to the hangers. It should be understood that any type of coupling may be utilized to hang components from the hangers 50.

It should also be understood that as illustrated herein, the keys 20 are indentations in the webs 10 in which the connectors 150, 250 are secured within. Alternatively, the keys 20 may be a projection around which an indented connector 150, 250 (e.g. concave, or the like) may be operatively coupled. For example, the key 20 may project inwardly into the lower fluted cavity 7 (e.g., similar to the inwardly extending discontinuous vented key 64 shown in FIG. 3G) and at least a portion of the connector 150, 250 may surround at least a portion of the key 20. Alternatively, the projection may provide a shelf, lip, or the like on which at least a portion of the decking hanger 50, or connector 150, 200 thereof may be operatively coupled (e.g., hang, surround, mate, or the like). In still other embodiments of the invention the one or more keys 20 may include both indentations in which the connectors 150, 250 may be operatively coupled, as described herein, and projections on which the connectors 150, 250 or a portion of the decking hanger 50 may be operatively coupled. Furthermore, one end of a hanger may be operatively with an indented key 20, while the other end may be operatively coupled to a projection key 20. Furthermore, different connectors on the same end may be operatively coupled to indented keys 20 and projection keys 20 on the same web. It should be understood that the projections, like the indentations, may provide surface to surface contact (i.e., friction), as well as walls (i.e., within the connector), that restrict the connector from moving with respect to the keys 20.

It should be understood that the present decking hanger system 1 and the associated decking hangers 50 are improvements over alternate methods of hanging components from the decking 2. For example, in the present invention, mating at least one connector 150, 250 surface on at least one end of the hanger 50 with a corresponding surface of a key 20, improves the frictional interaction between the hanger 50 and the key 20. For example, a hanger end 102, 202 with a connector 150, 250 that has a rounded shape has improved fit with rounded bends of the keys 20. The keys 20 and/or the hangers 50 may be designed in part, to maximize the interlocking of the connectors 150, 250 of the ends 102, 202 of the hanger 50 to the webs 10 of the decking 2. For example, the rounded shape (or other complementary shape between the keys 20 and hangers 50) reduces stress concentrations at the bearing points against the decking 2, which increases the strength of the decking system 1 and/or the hangers 50. As such, in some embodiments the keys 20 may be designed to interlock with a hanger 50, the hanger 50 may be designed to interlock with keys 50 (e.g., one or more keys), and/or the keys 20 and/or hangers 50 may be designed together to provide the load resistance of the decking system 1.

Moreover, with respect to utilizing discontinuous keys 30 in the webs, mating the connectors 150, 250 of the ends 102, 202 of the hangers 50 with discontinuous keys 30 (e.g. impression, projection, or the like) on multiple sides (e.g., all sides) prevents slippage of the hanger end 102, 202 in each loading direction. As such, the hangers 50 are less likely to slip within the keys 20 (e.g., as may occur within one direction in a continuous key 22) if the friction force and/or bearing force are overcome by the loading of the hangers 50 in a particular direction.

Furthermore, the embodiments of the hangers 50 that utilize three points of contact by utilizing two or more connectors 150, 250 on at least one of the ends 102, 202 provides superior in plane shear resistance. Three points of contact offers greater resistance to unintentional "removal" under loading or after slippage caused by loading. Additionally, the three points of contact provide improved rotational resistance along the longitudinal axis of the hangers 50, as well as additional surface contact for increased load resistance.

In other embodiments, the strut hanger 100 may comprise one or more orientation projections 190 that are located adjacent one or more of the ends 102 of the strut hanger 100, such as adjacent the first end 104 and/or the second end 106 and/or as a part of the connectors 150 on the ends 102. The orientation projections 190 may serve multiple purposes, such as orienting the strut hanger 100 within the decking 2 (e.g., with the pre-formed keys 20 and/or within the webs 10 of the flutes 2 in one or more orientations), orienting the strut hanger 100 such that one or more hanger apertures 180 are perpendicular or generally perpendicular (e.g., +/−5, 10, 15, 20, 25, 30, 45 degrees) with the decking or the floor of the building, and/or for inhibiting rotation of the strut hanger 100 within the pre-formed keys 20 and/or within the flutes 2. It should be understood that the orientation projections 190 may be located anywhere adjacent the ends 102 of the strut hanger 100, in specific locations adjacent the end, around the entire surface of the ends 102 (e.g., circumferentially around the ends 102), or the like.

Figure 18A:
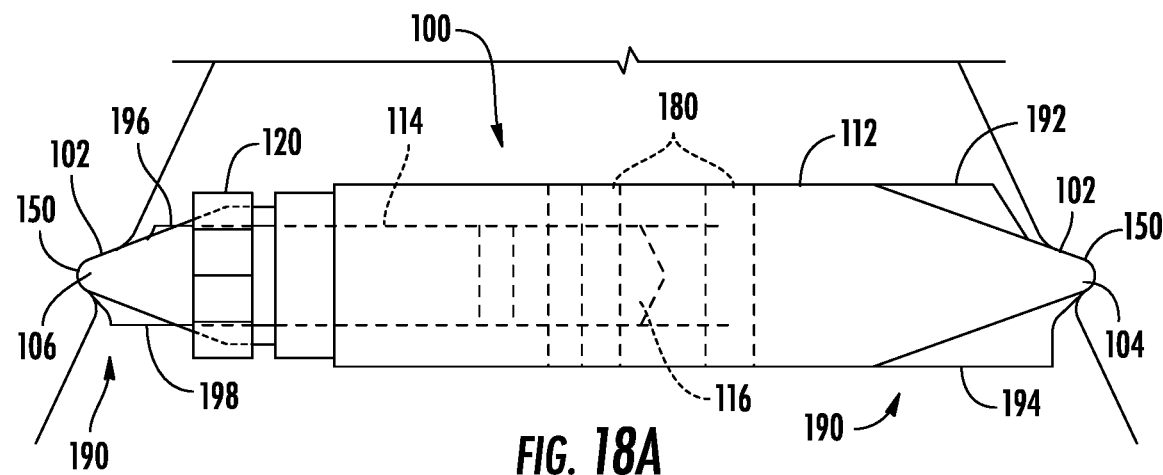
FIG. 18A illustrates a side view of a decking hanger bracket with orientation projections, in accordance with some embodiments of the invention.
Figure 18B:
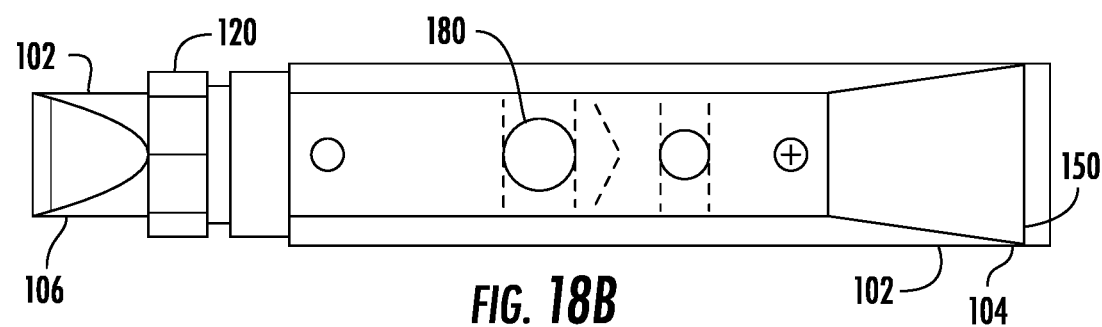
FIG. 18B illustrates a bottom view of the decking hanger bracket with orientation projections, in accordance with some embodiments of the invention.

In some embodiments, as illustrated in FIGS. 18A and 18B the one or more orientation projections 190 (e.g., a first end upper projection 192, a first end lower projection 194, a second end upper projection 196, a second end lower projection 198, or the like), may be operatively coupled to the strut hanger 100 adjacent the first end 104 and/or the second end 106 (e.g., integral with, removeably attached to, or the like). For example, the one or more orientation projections 190 may extend from a portion of the strut hanger 100, such as a first portion 112, a second portion 114, from one or more connectors 150 on either end 102 of the strut hanger 100, or the like. In some embodiments, the one or more lower projections 194, 198 may be larger (e.g., wider, longer, taller, or the like) than the one or more upper projections 192, 196, such that when installing the strut hanger 100 the strut hanger 100 may only be installed in certain orientations (e.g., the one or more orientation projections 190 allow and/or prevent installation in one or more orientations). For example, if trying to install the strut hanger 100 with the lower projections 194, 198 installed upwardly into the flute 4 (e.g., lower projections 194, 198 facing upward), then the connectors 150 would not be able to operatively couple with the pre-formed keys 20 of the decking 2 (e.g., the lower orientation projections 194, 198, would prevent alignment of the ends 102 of the connectors 150 with the pre-formed keys 20, would prevent extension of the connectors 150 into the pre-formed keys 20, or the like).

In some embodiments, the one or more orientation projections 190 may be shaped generally to conform to the webs 10 of the flute 2 (e.g., as illustrated in FIGS. 18A and 18B) and/or may be shaped generally to confirm with the pre-formed keys 20 (e.g., as illustrated in FIGS. 7A-7C). For example, the one or more orientation projections 190 may have the same or similar angle as the webs 10 of the flute 2 and/or the pre-formed keys 20, such that the orientation projections 190 are parallel or generally parallel (e.g., +/−5, 10, 15, 20, 25, 30, or the like degrees) with the webs 10 and/or surfaces of the pre-formed keys 20. In some embodiments, the surfaces of the one or more orientation projections 190 may operatively couple with the surfaces of the webs 10 adjacent the pre-formed keys 20, and/or the pre-formed keys 20 themselves, when the strut hanger 100 is extended into the installed position. It should be further understood that the orientation projections may be formed integral with the hanger 50 or may be removable from the hanger 50.

As previously discussed, the one or more pre-formed keys 20 and the connectors 150 at the ends 102 of the strut hanger 100 may be shaped in a way that only allows orientation in one or more orientations (e.g., a single orientation, or allowed in particular orientations while preventing other orientations), as illustrated in FIGS. 7A-7C. Alternatively, or additionally, there may be notches and/or protrusions in the connectors 150 and/or the pre-formed keys 20, which allows and/or prevents the orientation of assembly in one or more orientations.

Figure 19A:
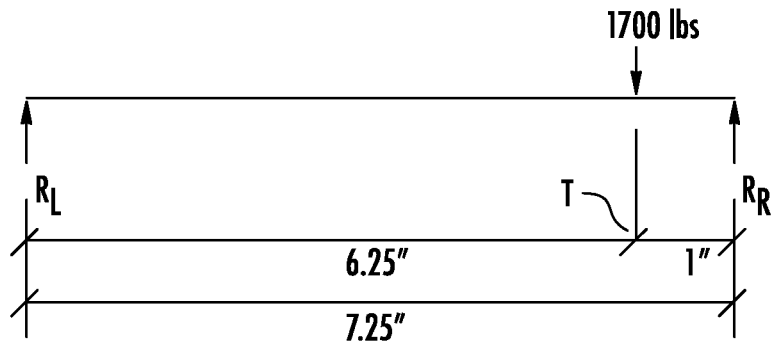
FIG. 19A illustrates a force diagram, in accordance with some embodiments of the invention.
Figure 19B:
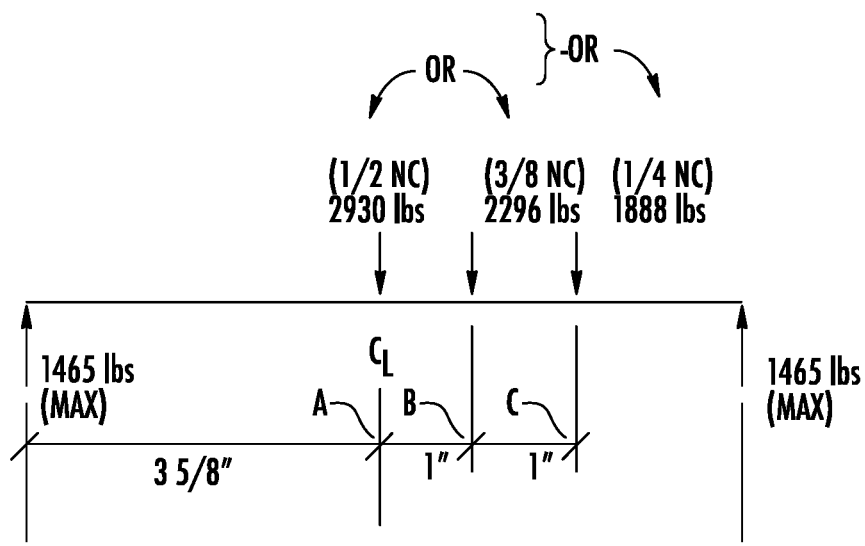
FIG. 19B illustrates a force diagram for various loading locations, in accordance with some embodiments of the invention.

Moreover, as illustrated in FIGS. 18A and 18B, the strut hanger 100 has one or more hanger apertures 180 (e.g., a center aperture 182, one or more secondary apertures 184 located adjacent the center aperture 182 or adjacent one or more of the ends 102. In some embodiments, one of the apertures 180 may be located at the center of the strut hanger 100 when the strut hanger 100 is installed and extended into the pre-formed keys 20. Locating the aperture at the center, or near the center, maximizes the load that the hanger and the decking system 1 (e.g., combination of the hanger 50, decking, or the like) is capable of supporting. FIGS. 19A and 19B illustrate the loading that the strut hanger 100 is capable of supporting at various locations along the length of the hanger 50 for a representative decking system, such as a decking system having 20 gauge W3 deck with lightweight structural concreate on the decking. At location T, which is a representative location of loading approximately one (1) inch from the ends of the hanger where a load may typically be applied, the theoretical safe working load (e.g., load with a factor of safety) that may prevent a potential failure (e.g., breakout of the hanger) of the decking 2 may be 1700 lbs. at location T Based on the proposed hanger system (e.g., decking and lightweight structural concrete) the safe working load supported at the ends of the hanger can be determined (e.g., ((1700 lbs*6.25 in)/(7.25 in))=1465 lbs.). At location A (at the center) the max safe working load is the sum of the loading at the ends of the strut hanger 100 (e.g., 2930 lbs.). At location B (e.g., one inch from the center) the max safe working load is determined to be less than at the center (e.g., ((2930 lbs.*3.625)/(4.625 in))=2296 lbs.). Moreover, at location C (e.g., two inches from the center) the max safe working load is determined to be less than at locations A and B (e.g., ((2930 lbs.*3.625)/(5.625 in))=1888 lbs.). As such, the example loading provided herein is used to illustrate the loading that the hanger can handle is maximized when the loading occurs at the center of the strut hanger 100 (i.e., in the center of the flute cavity 7). Returning to FIGS. 18A and 18B, in some embodiments of the invention, multiple apertures 180 are located in the strut hanger 100, each of which may or may not be utilized to support a load from the hanger 50 at different locations. For example, in some embodiments, in order to support a load at the center of the hanger 50, after the hanger is installed, the second portion 114 is extended beyond the location of the one or more apertures (e.g., beyond the aperture in the center in order to allow a rod to run through the center aperture of the hanger). Alternatively, the first portion 112 of the hanger may have enough material to receive a rod (e.g., threaded bolt) for hanging equipment (or the like) without having to extend the rod into the female portion 116 that houses the second portion 114 of the hanger 100 described herein.

In some embodiments, the first portion 112 of the hanger may have a female portion 116, such as an aperture that receives the second portion 114 (e.g., a fastener, or the like). The strut hanger 100 may further have a hanging aperture 180 that is perpendicular or generally perpendicular to the female portion 116 (e.g., the internal aperture of the first portion). In some embodiments, as illustrated in FIGS. 18A and 18B the hanging aperture 180 may extend into, or through, a portion of the female portion 116 (e.g., internal aperture of the first portion). In this way, the female portion 116 allows for maximum retraction of the second portion 114 of the hanger into the female portion 116 of the hanger 110 for assembly, but also allows for the best hanger stiffness and load resistance from the hanger when the portions 112, 114 are extended during assembly into the pre-formed keys 20. For example, as illustrated in FIG. 18A, when installed, the distal end of the second portion 114 of the strut hanger 100 is operatively coupled (e.g., extended into, or the like) the pre-formed key 20, while the proximate end of the hanger is located within the female portion 116 just outside of the hanging aperture 180. As such, the center hanging aperture 182 may be located at the center of the strut hanger 100 and/or the center of the flute 2 to provide the maximum hanger loading while allowing for assembly of the hanger 50 into the flute 2 of the decking 2. In other embodiments of the invention, the second portion 114 may have an aperture and/or be slotted (e.g., have one or more hanger apertures 180) in order to allow the proximal end of the second portion 114 to extend past the center of the hanger while still allowing for hanging at the center of the strut hanger 100 and/or flute 2. Alternatively, or additionally, the second portion 114 may include one or more of the hanger apertures (not illustrated) such that components (e.g., smaller components) may be hung from an aperture located within the second portion 114.

Figure 20A:
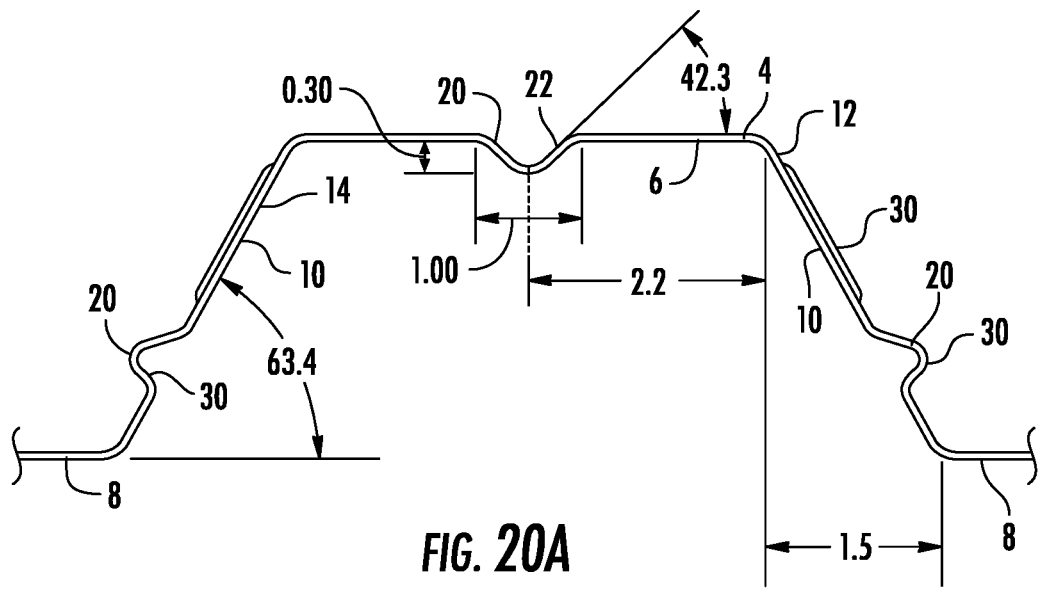
FIG. 20A illustrates a side view of the decking and dimensions thereof, in accordance with some embodiments of the invention.

In some embodiments, not specifically illustrated herein, a rod (e.g., fastener, or the like of any shape used to hang components from the hanger 50) may extend through the one or more apertures 180 of the hanger 50, and may operatively couple with the upper flange 6 of the flute 2. As such, in some embodiments, the rod may operatively couple with a flat surface of the upper flange 6 of the flute 2. Alternatively, the upper flange 6 may also have a pre-formed key 20, as illustrated in FIG. 20A. The pre-formed key 20 in the upper flange 6 may extend outwardly away from the decking, or inwardly into a cavity of the flute 2 (as illustrated in FIG. 20A). As such, in some embodiments the rod may engage around (e.g., have a concave surface, or other like surface, that extends around the pre-formed key 20), or be located within (e.g., have a connection 150 that extends into), the pre-formed key 20 in the upper flange 6. The additional coupling of the rod with a pre-formed key 20 in the upper flange 6 may provide additional stability to the hanger system (e.g., the hanger 50 within the flute 2) and/or additional shear loading capacity.

Figure 20B:
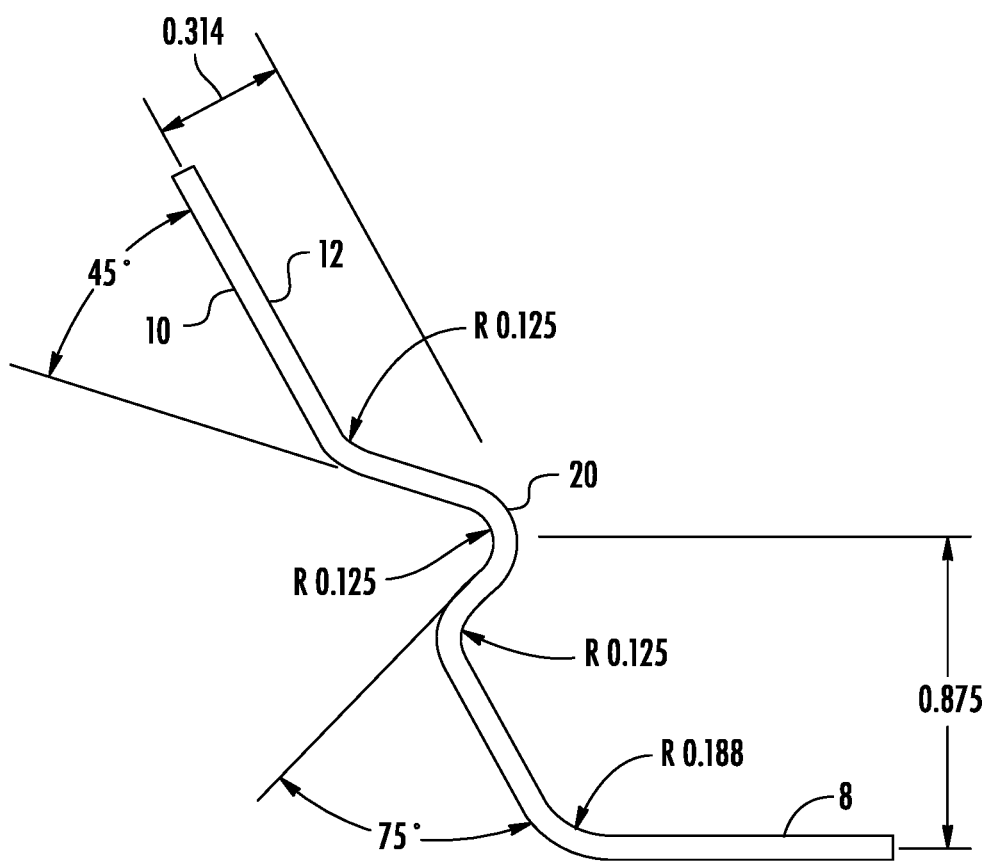
FIG. 20B illustrates a side view of the web of the decking and dimensions thereof, in accordance with some embodiments of the invention.

FIGS. 20A and 20B illustrate the dimensions of the decking panels 2 and the pre-formed keys 20 in the webs 10 and/or the upper flange 6, in according with some embodiments of the invention. It should be understood that in some embodiments of the invention, the dimensions illustrated in FIGS. 20A and 20B may be +/−1, 2, 3, 4, 5, 6, 7, 8, 9, 10, 15, 20, 25, 30, 35, 40, 45, 50, 60, 70, 80, 90, or the like percent from the illustrated dimensions. Moreover, the dimensions illustrated in FIGS. 20A and 20B or described above may be within, overlap, or be located outside of any of the forgoing dimensions (e.g., illustrated in FIGS. 20A and 20B or determined based on the percentage ranges).

The present invention also provides improved installation. For example, the hangers 50 described herein may be assembled to the decking without the need for drilling and/or creating holes in the decking and associated concrete. When drilling into building material additional precautions may be required, such as additional harnesses to allow for the use of both hands of an installer, particulate prevention to capture dust and other particles caused from drilling or other processes and/or equipment to prevent such particulates from being ingested, or the like. Additionally, utilizing drills or other tools to disrupt building material typically increases the time it takes to install traditional hanging systems. Moreover, drilling holes, or otherwise assembling a hanger that can pierce and/or deform the decking at the web, when the web has a flat surface makes it harder to correctly position the hanger. Misaligning the hanger may result in reducing the effectiveness of the hanger, such as decreasing the maximum loading that the hanger can handle during normal operation and/or in response to external stresses. Alternatively, the present invention provides improved assembly processes because the connectors 150, 250 of the ends 102, 202 of the hangers 50 and the pre-formed keys 20 in the webs 10 of the decking 2 provide quick assembly locations at different heights and lengths within the flutes of the decking 2. Moreover, the adjustments 140, 240 of the hangers 50 allow for quick assembly and disassembly of the hangers 50 from the decking 20 to allow for installing and/or moving components as needed.

Generally, it should be understood that the material used to form the structural decking 2 may be manufactured from a variety of rigid materials including steel, aluminum, titanium, plastic, a composite, or another type of rigid material, or combinations thereof. Typical decking 2 is made of steel and is sized in ranges from 12 inches to 42 inches wide by 1 foot to 50 feet long. These dimensions include some sizes of structural decking, but it should be understood that any sizes of structural decking within these ranges, overlapping these ranges, or outside of these ranges might be utilized with the present invention. The material thickness of the decking panels 2 may be any thickness; however, typical panel thicknesses may range between 22 gage and 16 gage, inclusive. Other material thicknesses of the present invention may be within this range, overlap this range, or be located outside of this range.

The decking panels 2 may have profiles that include any type of flutes 4. The profiles of the decking panels 2 may be referred to as "fluted profiles," "hat profiles", "flat-bottomed profiles", "triangular profiles," "trapezoidal profiles," "dovetail profiles," or other like profiles. The distance from the top of the upper flange 4 and the lower flange 6 may generally range from 1½ inches to 3 inches in depth; however other ranges of depths within this range, overlapping this range, or outside of this range may be used in the profiles. For example, in some embodiments the distance may range from 1 inch to 12 inches in depth, or the like. The decking 2 may or may not include other longitudinal ribs, bends, or cutouts that provide the desired (e.g., intended, required, or the like) structural strength and/or stiffness. Depending on the material thickness, the length and width of the panels 2, and the height of the upper flanges 4 and lower flanges 6, the decking may weigh between 100 and 420 lbs. In other embodiments, the weight of the panels may be within, overlap, or be located outside of this range.

The sizes and thicknesses of the decking 2 are determined based on the engineering requirements for the desired application of the structural decking 2. In one particular embodiment of the invention, the decking 2 is used as roofs and are required to meet the structural requirements for withstanding potential seismic activity, high winds, and/or other natural or man-made forces. If the hangers are not properly installed and/or fail to provide the desired resistance to loading the components hanging from the decking 2, and/or the hangers supporting the components may fail. As described herein, the present invention provides improved decking hanging systems 1 and/or decking hangers 50, which allow for increased resistance to loading, an in particular shear loading.

Figure 21:
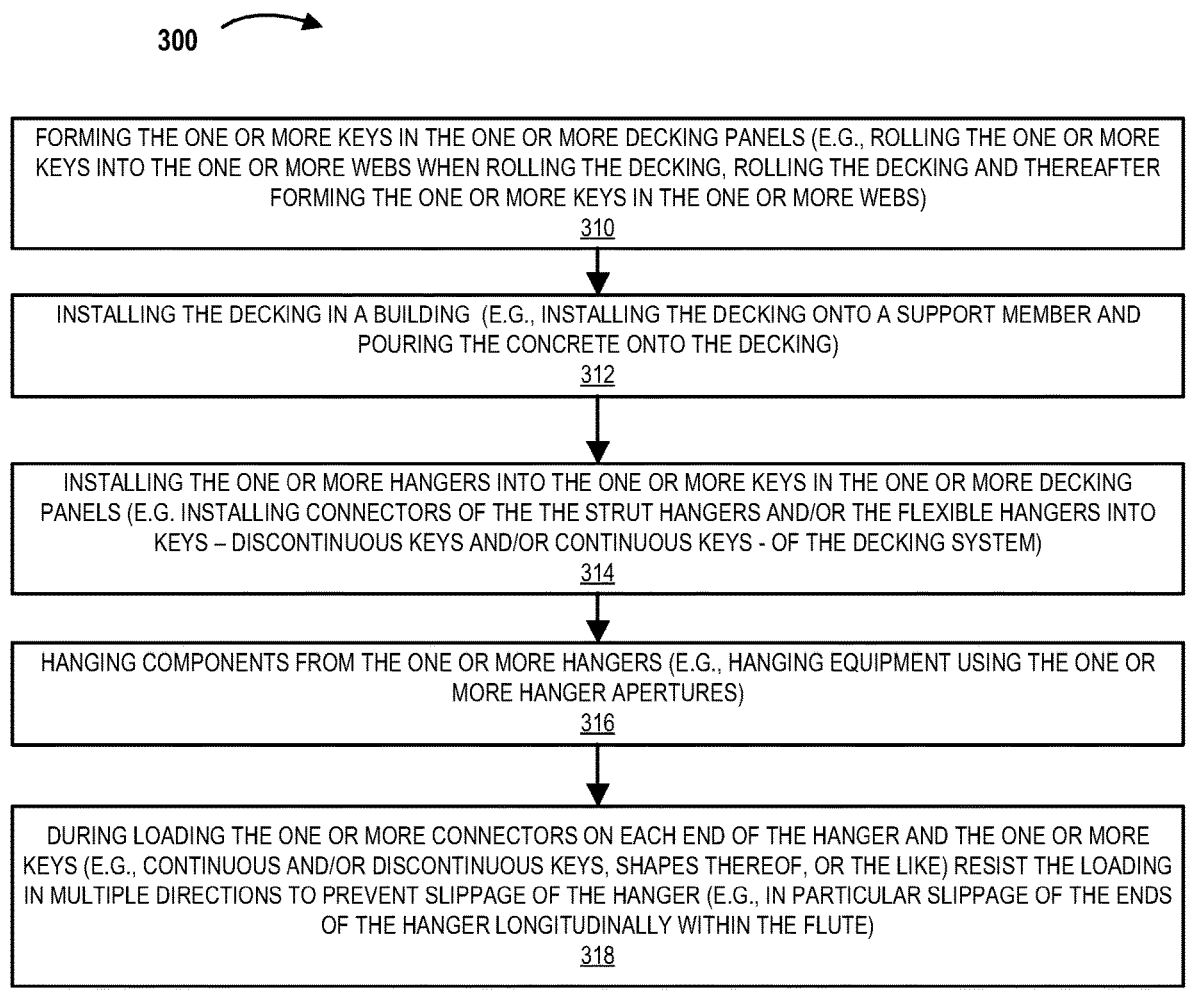
FIG. 21 illustrates a method of forming and installing the decking hanger system, in accordance with some embodiments of the invention.

FIG. 21 illustrates a method 300 of forming the decking 2, installing the decking hanger system 1, and the operation of the decking hanger system 1 during loading. As illustrated in block 310 of FIG. 21, the one or more keys are formed in the decking panels 2. For example, it should be understood that in some embodiments the rollers that are used to roll-form the decking panels 2 may comprise protrusions, such that when the decking panels are being rolled the protrusions form the plurality of keys 20 (e.g., continuous keys 22 and/or discontinuous keys 30) in the webs 10 and/or flanges 6, 8 of the decking panel 2. In other embodiments of the invention the decking panels 2 may be rolled first, and after forming the decking panels 2, the plurality of keys 20 may be formed into the webs 10 and/or flanges 6, 8. For example, a second set of rollers may be used to create the plurality of keys 20, the plurality of keys 20 may be stamped, the plurality of keys 20 may be punched, or any other post processing (e.g., post rolling) may be used to form the keys 20.

Block 312 of FIG. 21 further illustrates that the decking 2 is installed within a building. It should be understood that the decking may be installed using traditional installation methods, such as securing the decking to support members (e.g., beams, walls, girders, joists, or the like) and creating couplings in a sidelap between the decking panels 2 (e.g., welding, fasteners, sheared, or the like coupling). Thereafter, concreate is poured over the decking (e.g., lightweight structural concreate, or the like).

Block 314 of FIG. 21 further illustrates that the hangers 50 (e.g., strut hanger 100, flexible hanger 200, or the like) may be installed within the decking panels 2, as described and illustrated herein. For example, the adjustment feature 140 of the strut hanger 100 (e.g., rotating a bolt, or the like) may be utilized to install the one or more connectors 150 at the one or more ends 102 of the hangers 100 into the one or more pre-formed keys 20 within the webs 10 of the flutes 4 of the decking 2. Alternatively, the flexible hanger 200 may be flexed, moved into position, and released in order to expand into the one or more keys 20. It should be understood that using the discontinuous keys 30, a connector 150 with a shape that has surface mating with the surfaces of keys 20 (e.g., to create surface to surface contact, which may increase the friction force between the surfaces), and/or multiple connectors 150 (e.g., in combination with a continuous key 22 and/or discontinuous keys 30) on one end of the strut hanger 100 and/or flexible hanger 200 provides load resistance in multiple directions. As such, unlike using a hanger in a continuous key or against the decking without a key, the hangers 50 of the present disclosure are less likely to slip during loading, and in particular less likely to slip in the longitudinally direction within the flute 4. Additionally, the hangers are much easier to install within the decking 2 do the pre-formed keys 20. That is, the decking has pre-formed locations at which to install the hangers 50. This reduces the issues with an installer trying to orient a hanger in the proper orientation within the flute cavity 7 (e.g., perpendicular to the direction of the flute 4), and at the same time applying the force needed to secure the hanger within the flute cavity 7.

FIG. 21 further illustrates in block 316, that after the hanger 50 is installed, an installer may install (e.g., hang) components (e.g., equipment, duct work, pipes, or the like) from the hanger 50. For example, a rod (e.g., threaded, or the like) may be installed into one or more of the apertures 180, 280 of hangers 50 (e.g., in some embodiments in an aperture located in the center of the hanger for providing an improved safe working load). In some embodiments the rod may be threaded into the hanger 50, or a fastener (e.g., a nut) may be threaded onto the rod after the rod passes through an aperture 180, 280 in the hanger 50.

Block 318 of FIG. 21 illustrates that after installation, during operation, the decking hanger system 1 provides improved load resistance over current hanger systems. For example, as the building, decking, and/or components are subjected to loading (e.g., loading from seismic, wind, other natural or man-made disasters, loading from the hanging components themselves, or the like) the hangers 50 described herein provide improved load resistance as discussed throughout this disclosure (e.g., as discussed with respect to block 314, or the like).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

It should be understood that "operatively coupled," "operatively coupling," "operatively couple," or the like when used herein, means that the components may be formed integrally with each other, or may be formed separately and coupled together. Furthermore, "operatively coupled," or the related terminology, means that the components may be formed directly to each other, or to each other with one or more components located between the components that are operatively coupled together. Furthermore, "operatively coupled," or the related terminology may mean that the components are detachable (removable, or the like) from each other, or that they are permanently coupled together.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

What is claimed is:

1. A decking hanger system, comprising:
   at least one decking panel comprising:
   a plurality of decking flutes, wherein each of the plurality of decking flutes comprise an upper flange, a lower flange, and one or more webs operatively coupling the upper flange and the lower flange; and
   one or more keys formed in the one or more webs of one or more decking flutes of the plurality of decking flutes within the at least one decking panel;
   a hanger comprising:

a first portion having a first end, wherein the first portion comprises an end aperture extending within the first portion and one or more component apertures extending through the first portion and the end aperture;

a second portion having a second end; and an adjustment for moving the first end with respect to the second end, wherein the adjustment for moving the first end with respect to the second end is provided by at least a portion of the second portion located within the end aperture of the first portion and moving within the end aperture of the first portion;

wherein the first end or the second end comprise one or more connectors; and wherein the one or more connectors of the first end or the second end mates with the one or more keys.

2. The decking hanger system of claim 1, wherein the one or more keys comprise a plurality of discontinuous keys formed in the one or more webs.

3. The decking hanger system of claim 2, wherein at least a portion of the plurality of discontinuous keys have key lengths that are greater than key heights, and extend longitudinally with the one or more flutes.

4. The decking hanger system of claim 3, wherein at least the portion of the plurality of discontinuous keys are located in series in a row.

5. The decking hanger system of claim 3, wherein at least the portion of the plurality of discontinuous keys are located in two or more rows.

6. The decking hanger system of claim 2, wherein at least a portion of the plurality of discontinuous keys have key heights that are greater than key lengths, and extend longitudinally with the one or more flutes.

7. The decking hanger system of claim 6, wherein at least the portion of the plurality of the discontinuous keys are located in series in a row.

8. The decking hanger system of claim 6, wherein at least the portion of the plurality of discontinuous keys are located in two or more rows.

9. The decking hanger system of claim 1, wherein the one or more keys resist lateral movement and longitudinal movement in all directions of the first end of the hanger.

10. The decking hanger system of claim 1, wherein the first end of the hanger comprises two or more connectors.

11. The decking hanger system of claim 1, wherein the one or more keys are formed in at least a first web and at least a second web opposite the first web of the one or more flutes.

12. The decking hanger system of claim 11, wherein the one or more connectors of the first end are operatively coupled to one or more first keys of the first web, and wherein the one or more connectors of the second end are operatively coupled to one or more second keys of the second web.

13. The decking hanger system of claim 1, wherein the one or more connectors of the first end or the second end comprise a rounded connector surface.

14. The decking hanger system of claim 13, wherein the rounded connector surface of the one or more connectors of the first end or the second end comprises:

a rounded line connector surface;

wherein the rounded line connector surface has a connector width wider than a connector height to fit within the one or more keys having a key length that is greater than a key height.

15. The decking hanger system of claim 1, wherein the adjustment for moving the first end with respect to the second end comprises a fastener that rotates to move the first end with respect to the second end, a slide that allows the first end to move with respect to the second end, or a lever that allows the first end to move with respect to the second end.

16. The decking hanger system of claim 1, wherein the hanger further comprises:

one or more orientation projections operatively coupled to the hanger adjacent the first end or the second end.

17. The decking hanger system of claim 16, wherein the one or more orientation projections allow operative coupling of the one or more connectors of the first end or the second end to the one or more keys in one or more orientations, while preventing operative coupling of the one or more connectors of the first end or the second end to the one or more keys in one or more other orientations.

18. A hanger for a decking system, the hanger comprising:

a first portion having a first end, wherein the first portion comprises an end aperture extending within the first portion and one or more component apertures extending through the first portion and the end aperture;

a second portion having a second end; and an adjustment for moving the first end with respect to the second end, wherein the adjustment for moving the first end with respect to the second end is provided by at least a portion of the second portion located within the end aperture of the first portion and moving within the end aperture of the first portion;

wherein the first end or the second end comprise one or more connectors;

wherein the one or more connectors of the first end or the second end is configured to mate to one or more keys formed in one or more webs of one or more decking panels.

19. The hanger of claim 18, wherein the one or more connectors of the first end or the second end comprise a rounded connector surface, and wherein the rounded connector surface of the one or more connectors of the first end or the second end comprises a rounded conical connector surface or a rounded line connector surface.

20. A method of installing a hanger for a decking hanger system, the method comprising:

installing a hanger to a flute of a decking panel, wherein the hanger comprises:

a first portion having a first end, wherein the first portion comprises an end aperture extending within the first portion and one or more component apertures extending through the first portion and the end aperture;

a second portion having a second end; and an adjustment for moving the first end with respect to the second end, wherein the adjustment for moving the first end with respect to the second end is provided by at least a portion of the second portion located within the end aperture of the first portion and moving within the end aperture of the first portion;

wherein the first end or the second end comprise one or more connectors; and wherein the decking panel comprises:

a plurality of decking flutes, wherein each of the plurality of decking flutes comprise an upper flange, a lower flange, and one or more webs operatively coupling the upper flange and the lower flange; and one or more keys formed in the one or more webs of one or more decking flutes of the plurality of decking flutes within the decking panel; and moving the first portion or second portion within a flute of the plurality flutes such that the one or more connectors of the first end or the second end mates with the one or more keys.

21. The decking hanger system of claim 13, wherein the rounded connector surface of the one or more connectors of the first end or the second end comprises a rounded conical connector surface.

* * * * *